United States Patent
Asrani et al.

(10) Patent No.: US 12,322,078 B2
(45) Date of Patent: Jun. 3, 2025

(54) METHOD AND SYSTEM FOR DETECTION AND LOCALIZATION OF THERMAL DEFECTS

(71) Applicant: QEATECH INC., Markham (CA)

(72) Inventors: Mansour Asrani, Toronto (CA); Peyvand Melati Rad, Markham (CA); Omid Alaei, Thornhill (CA)

(73) Assignee: QEATECH INC., Markham (CA)

( * ) Notice: Subject to any disclaimer, the term of this patent is extended or adjusted under 35 U.S.C. 154(b) by 0 days.

(21) Appl. No.: 18/731,876

(22) Filed: Jun. 3, 2024

(65) Prior Publication Data

US 2024/0404033 A1 Dec. 5, 2024

Related U.S. Application Data

(60) Provisional application No. 63/505,569, filed on Jun. 1, 2023.

(51) Int. Cl.
*G06T 7/00* (2017.01)
*G06T 7/12* (2017.01)
(Continued)

(52) U.S. Cl.
CPC ............. *G06T 7/0002* (2013.01); *G06T 7/12* (2017.01); *G06T 7/13* (2017.01); *G06T 7/50* (2017.01);
(Continued)

(58) Field of Classification Search
None
See application file for complete search history.

(56) References Cited

U.S. PATENT DOCUMENTS 7,220,966 B2 5/2007 Saito et al.
8,764,285 B2 7/2014 Lee et al.
(Continued)

FOREIGN PATENT DOCUMENTS

CN 103163181 A 6/2013
CN 112669286 A 4/2021
(Continued)

OTHER PUBLICATIONS

Changmin et al., Automated classification of thermal defects in the building envelope using thermal and visible images; Quantitative InfraRed Thermography Journal , Jan. 31, 2022 vol. 20, No. 30, pp. 106-122 {online}, Retrieved from <https://doi.org/10.1080/17686733.2022.2033531.
(Continued)

*Primary Examiner* — Stuart D Bennett
(74) *Attorney, Agent, or Firm* — Own Innovation Inc.; James W. Hinton

(57) ABSTRACT

A system and associated method for thermal inspection of structures. The method includes providing an unmanned aerial vehicle ("UAV"), the UAV comprising a thermal camera for capturing thermal image data, a visible light camera for capturing visible light image data, and a positioning system for capturing positioning data, operating the UAV by flying the UAV along a predetermined flight path around an inspection structure, simultaneously capturing thermal image data of the inspection structure, visible light image data of the inspection structure, and positioning data at regular intervals, while the UAV flies along the flight path.

20 Claims, 16 Drawing Sheets

(51) Int. Cl.
  *G06T 7/13* (2017.01)
  *G06T 7/50* (2017.01)
  *H04N 23/11* (2023.01)
  *B64U 20/87* (2023.01)
  *B64U 101/26* (2023.01)
  *B64U 101/30* (2023.01)
  *G06V 10/764* (2022.01)

(52) U.S. Cl.
  CPC ............. *H04N 23/11* (2023.01); *B64U 20/87* (2023.01); *B64U 2101/26* (2023.01); *B64U 2101/30* (2023.01); *G06T 2207/10032* (2013.01); *G06T 2207/10048* (2013.01); *G06T 2207/20081* (2013.01); *G06T 2207/20084* (2013.01); *G06T 2207/20092* (2013.01); *G06T 2207/30184* (2013.01); *G06V 10/764* (2022.01)

(56) References Cited

U.S. PATENT DOCUMENTS

| | | | |
|---|---|---|---|
| 9,613,538 | B1 | 4/2017 | Poole et al. |
| 10,533,903 | B2 | 1/2020 | Mischke |
| 11,403,749 | B2 | 8/2022 | You et al. |
| 2016/0284075 | A1 | 9/2016 | Phan et al. |
| 2019/0094124 | A1 | 3/2019 | Amer et al. |
| 2022/0011164 | A1* | 1/2022 | Wildermuth ............ G06T 7/136 |
| 2022/0182532 | A1* | 6/2022 | Fairfield .................. H04N 9/64 |
| 2022/0340274 | A1 | 10/2022 | Motahar et al. |
| 2022/0343037 | A1* | 10/2022 | Motahar ................ B64U 50/19 |
| 2022/0400536 | A1* | 12/2022 | Allenspach ............... F17D 1/05 |
| 2023/0204424 | A1* | 6/2023 | Ranganathan ......... G06V 20/13 348/144 |
| 2023/0289593 | A1* | 9/2023 | Kim ........................ G06N 3/08 |

FOREIGN PATENT DOCUMENTS

| | | |
|---|---|---|
| CN | 115144434 A | 10/2022 |
| CN | 115601331 A | 1/2023 |
| WO | 2009074783 A1 | 6/2009 |

OTHER PUBLICATIONS

CIPO as ISA, International Search Report and Written Opinion for PCT/CA2024/050743, Aug. 8, 2028.

Barahona et al., "Detection of thermal anomalies on building facades using infrared thermography and supervised learning", Journal of Physics: Conference Series, 2021, pp. 1-6.

Bayomi et al., Building envelope modeling calibration using aerial thermography, Energy and Buildings, 2021, vol. 233.

Dabetwar et al., "Sensitivity Analysis of Unmanned Aerial Vehicle-borne 3D Point Cloud Reconstruction from Infrared Images", Journal of Building Engineering, Oct. 15, 2022, pp. 1-25, vol. 58.

Mayer et al., "Deep learning approaches to building rooftop thermal bridge detection from aerial images", Automation in Construction, Dec. 12, 2022, pp. 1-9.

Puliti et al., "Automated subsurface defects' detection using point cloud reconstruction from infrared images", Automation in Construction, 2021, vol. 129.

Rakha et al., "3D Drone-based Time-lapse Thermography: A Case Study of Roof Vulnerability Characterization using Photogrammetry and Performance Simulation Implications", Proceedings of the 17th IBPSA Conference, Sep. 2021, pp. 2023-2030.

Zhent et al., "A Thermal Performance Detection Method for Building Envelope Based on 3D Model Generated by UAV Thermal Imagery", Energies 2020, Dec. 17, 2020, pp. 1-18.

* cited by examiner

326

328

METHOD AND SYSTEM FOR DETECTION AND LOCALIZATION OF THERMAL DEFECTS

TECHNICAL FIELD

The following relates generally to thermal anomaly detection systems and methods, and more particularly to systems and methods for detecting thermal anomalies of buildings using visible light and infrared images captured using an unmanned aerial vehicle, and quantifying the thermal losses of located thermal anomalies.

INTRODUCTION

Structures, such as buildings may be configured to maintain internal temperatures differing from external temperatures, by the application of HVAC systems which maintain the internal climate of the structure according to certain specifications.

Buildings may be insulated to reduce the rate of heat transfer from the interior of the building or structure to the exterior, or vice versa. This reduction of heat transfer may advantageously result in reduced energy requirements (and therefore cost) to maintain internal building climate, and may maintain a more consistent temperature across the interior of the building or structure.

Insulation, such as wall panels, roof panels, insulating windows and other insulating components may be subject to wear and tear and degradation, which may reduce insulating performance. It may be difficult to detect such degradation, as it may not be visible to the naked eye.

Similarly, while certain equipment such as thermal cameras may detect thermal leakages which indicate insulation degradation, the use of such equipment may require large amounts of skilled labor to conduct the inspection and analyze the acquired thermal images to detect thermal anomalies.

Even if such thermal equipment is applied to building inspection, it may be difficult to quantity the individual effect of each defect, to prioritize repairs and maintenance of located defects.

Accordingly, there is a need for improved systems and methods for structural thermal anomaly detection that overcome at least some of the disadvantages of the current systems and methods relating to the measuring the individual impact of localized effects.

SUMMARY

Described herein is a thermal inspection method, according to an embodiment. The method includes providing an unmanned aerial vehicle ("UAV"), the UAV comprising a thermal camera for capturing thermal image data, a visible light camera for capturing visible light image data, and a positioning system for capturing positioning data, operating the UAV by flying the UAV along a predetermined flight path around an inspection structure, simultaneously capturing thermal image data of the inspection structure, visible light image data of the inspection structure, and positioning data at regular intervals, while the UAV flies along the flight path, defining a boundary around a building element within the thermal image data, identifying the maximum temperature pixel within the boundary of the building element, the maximum temperature pixel associated with the greatest temperature, defining a pixel region around the maximum temperature pixel according to a provided max walk parameter, expanding the pixel region by a provided max step parameter, defining an expanded pixel area and analyzing the shape of the expanded pixel area to identify a thermal anomaly.

According to some embodiments, the method further includes calculating the heat loss rate of the building element, estimating the heat loss rate of the building element if the thermal anomaly was not present and outputting a comparison of the estimated heat loss rate and calculated heat loss rate.

According to some embodiments, the temperature characteristics of the expanded pixel area is analyzed to identify the thermal anomaly.

According to some embodiments, max step and max walk parameters are provided to the method by a human operator.

According to some embodiments, the method further includes classifying the thermal anomaly as a known thermal anomaly class.

According to some embodiments, analyzing the shape of the expanded pixel area to identify a thermal anomaly comprises comparing the shape of the expanded pixel area to the shape of known thermal anomalies.

According to some embodiments, the method further includes generating a thermal loss map corresponding to the building envelope of the inspection structure that depicts the thermal loss rate of the inspection structure.

According to some embodiments, analyzing the shape of the expanded pixel area to identify a thermal anomaly comprises applying a trained machine learning model to analyze the shape.

According to some embodiments, the trained machine learning model is previously trained using known thermal anomaly data.

According to some embodiments, the trained machine learning model comprises a neural network.

Described herein is a thermal inspection system according to an embodiment. The system includes an unmanned aerial vehicle ("UAV"), the UAV comprising a thermal camera for capturing thermal image data, a visible light camera for capturing visible light image data, and a positioning system for capturing positioning data, an inspection structure for inspecting using the UAV, and a processor, wherein the UAV is configured to fly along a predetermined flight path around the inspection structure, simultaneously capturing thermal image data of the inspection structure, visible light image data of the inspection structure, and positioning data at regular intervals, while the UAV flies along the flight path, wherein the processor is configured to define a boundary around a building element within the thermal image data, identify the maximum temperature pixel within the boundary of the building element, the maximum temperature pixel associated with the greatest temperature, define a pixel region around the maximum temperature pixel according to a provided max walk parameter, expand the pixel region by a provided max step parameter, defining an expanded pixel area and analyze the shape of the expanded pixel area to identify a thermal anomaly.

According to some embodiments, the processor is further configured to calculate the heat loss rate of the building element, estimate the heat loss rate of the building element if the thermal anomaly was not present and output a comparison of the estimated heat loss rate and calculated heat loss rate.

According to some embodiments, the temperature characteristics of the expanded pixel area is analyzed by the processor to identify the thermal anomaly.

According to some embodiments, max step and max walk parameters are provided to the method by a human operator.

According to some embodiments, the processing is further configured to classify the thermal anomaly as a known thermal anomaly class.

According to some embodiments, analyzing the shape of the expanded pixel area to identify a thermal anomaly comprises comparing the shape of the expanded pixel area to the shape of known thermal anomalies.

According to some embodiments, the processor is further configured to generate a thermal loss map corresponding to the building envelope of the inspection structure that depicts the thermal loss rate of the inspection structure.

According to some embodiments, analyzing the shape of the expanded pixel area to identify a thermal anomaly comprises applying a trained machine learning model to analyze the shape.

According to some embodiments, the trained machine learning model is previously trained using known thermal anomaly data.

According to some embodiments, the trained machine learning model comprises a neural network.

Other aspects and features will become apparent to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
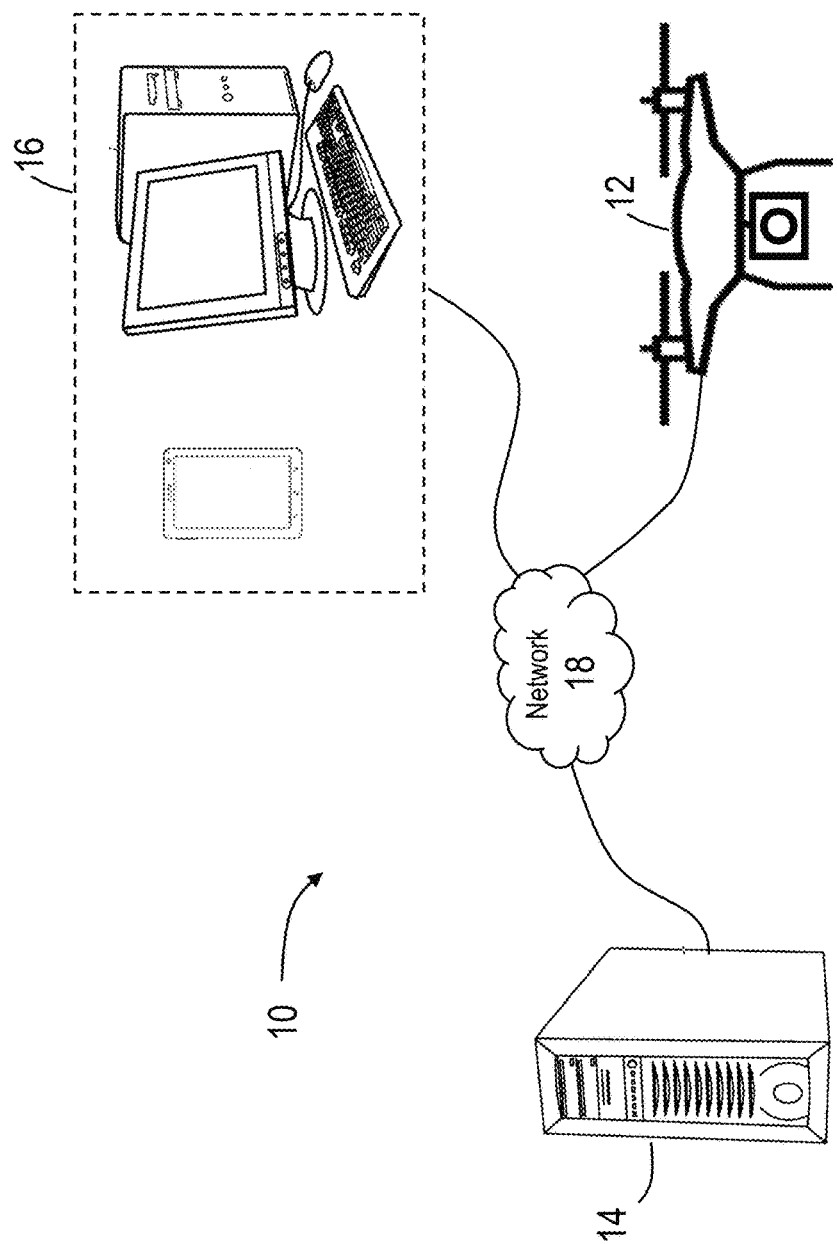
FIG. 1 is a system diagram of a thermal inspection system, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The following relates generally to methods and systems for detecting structure defects, and more particularly to systems and methods for detecting thermal anomalies, such as cracks, moisture leaks of buildings using visible light and thermal images captured using an unmanned aerial vehicle, and quantifying the thermal effects of the detected anomalies.

A large expense associated with operating a building or structure is climate control, wherein the interior portions of the building are heated, cooled, humidified and/or dehumidified. In order to reduce energy usage and therefore costs associated with climate control, buildings may be insulated to reduce heat transfer into and out of the building.

Over time, insulating materials and structures may degrade. For example, multi-pane glass windows may degrade such that internal gas tight seals no longer function, decreasing the insulating performance of the glass windows. This may increase the rate of heat transfer across the window.

Similarly, insulation or panels on the exterior of the building or structure may develop cracks or moisture leaks. Such cracks or leaks may reduce insulating performance of the insulation or panel, increasing the rate of heat transfer across the panel or window.

It may be difficult to detect such defects leading to reduced insulating performance. Insulation defects are often impossible to detect with the naked eye. Inspectors may employ technology such as infrared/thermal cameras to detect insulation defects, however, such methods are time consuming to carry out and analyze, and required highly skilled human operators. Further, it may be difficult to determine the individual effect of each located defect, such that maintenance operations may be prioritized.

Described herein are systems and methods for detecting structure thermal anomalies. An unmanned aerial vehicle may be provided. The unmanned aerial vehicle may conduct a preplanned flight around a structure, and capture a comprehensive set of overlapping images, along with position and orientation data. Images may be captured both the visible light and infrared domains. Thermal and visible light images may be taken at approximately the same angles, such that corresponding thermal and visible light images of each scene exist.

After images have been captured, images may be provided to a computing device for processing. The computing device may stitch together images into continuous images, determine image scale and orientation using UAV position and orientation data, apply automated methods to detect building elements, and analyze thermal images to detect localized thermal anomalies and/or defects. In some examples, a step-walk method described herein may be applied to detect localized thermal anomalies. The highest temperature point and/or pixel within a detected building element (e.g. wall, window, door etc.) may be identified. A region may be defined around this max temperature point or pixel, by a max walk and a max step parameter, each parameter provided by a human operator in some examples. This region may be analyzed to identify the region as a thermal anomaly. Such an analysis may include the shape and/or the temperature characteristics of the region.

Once thermal anomalies and/or defects have been detected, methods may be applied to determine the thermal effect of each located defect. For example, the energy loss contributed by each defect may be quantified, in terms of estimated monetary cost or heat loss rate, or other terms. Such quantifications may be applied to prioritize maintenance operations.

Referring first to FIG. 1, shown therein is a block diagram illustrating a thermal inspection system 10, in accordance with an embodiment. The system 10 includes an inspection unmanned aerial vehicle (UAV) 12 which communicates with a cloud processing device 14, and an operator terminal 16 via a network 18. The cloud processing device 14 may be a purpose-built machine designed specifically for processing thermal images, visible light images and other associated inspection data captured by UAV 12 to generate thermal inspection reports. The UAV 12 may be an unmanned aerial vehicle equipped with a thermal camera, visible light camera and positioning system, and may be operated to collect inspection data. The UAV 12 and/or the inspection operation as a whole may be configured or controlled by operator terminal 16 (e.g. the desired inspection target or flight path may be input into the terminal 16 by an operator).

In some examples of system 10, cloud processing device 14, and operator terminal 16 may comprise a single device.

The cloud processing device 14, and operator terminal 16 may be a server computer, desktop computer, notebook computer, tablet, PDA, smartphone, or another computing device. The devices 14, 16 may include a connection with the network 18 such as a wired or wireless connection to the Internet. In some cases, the network 18 may include other types of computer or telecommunication networks. The devices 14, 16 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage, or may be received from the Internet or other network 18. Input device may include any device for entering information into device 14, 16. For example, input device may be a keyboard, key pad, cursor-control device, touch-screen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, device 14, 16 may include multiple of any one or more of processors, applications, software modules, second storage devices, network connections, input devices, output devices, and display devices.

Although devices 14, 16 are described with various components, one skilled in the art will appreciate that the devices 14, 16 may in some cases contain fewer, additional or different components. In addition, although aspects of an implementation of the devices 14, 16 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 14, 16 and/or processor to perform a particular method.

In the description that follows, devices such as UAV 12, cloud processing device 14, and operator terminal 16 are described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the devices 12, 16 may send information to the cloud processing device 14. For example, an operator user using the operator terminal 16 may manipulate one or more input devices (e.g. a mouse and a keyboard) to interact with a user interface displayed on a display of the operator terminal 16. Generally, the device may receive a user interface from the network 18 (e.g. in the form of a webpage). Alternatively, or in addition, a user interface may be stored locally at a device (e.g. a cache of a webpage or a mobile application).

Cloud processing device 14 may be configured to receive a plurality of information, from the UAV 12, and operator device 16. Generally, the information may comprise at least a thermal image and visible light image.

In response to receiving information, the cloud processing device 14 may store the information in a storage database. The storage may correspond with secondary storage of the device 12, 14, 16. Generally, the storage database may be any suitable storage device such as a hard disk drive, a solid state drive, a memory card, or a disk (e.g. CD, DVD, or Blu-ray etc.). Also, the storage database may be locally connected with cloud processing device 14. In some cases, storage database may be located remotely from cloud processing device 14 and accessible to cloud processing device 14 across a network for example. In some cases, storage database may comprise one or more storage devices located at a networked cloud storage provider.

Figure 2:
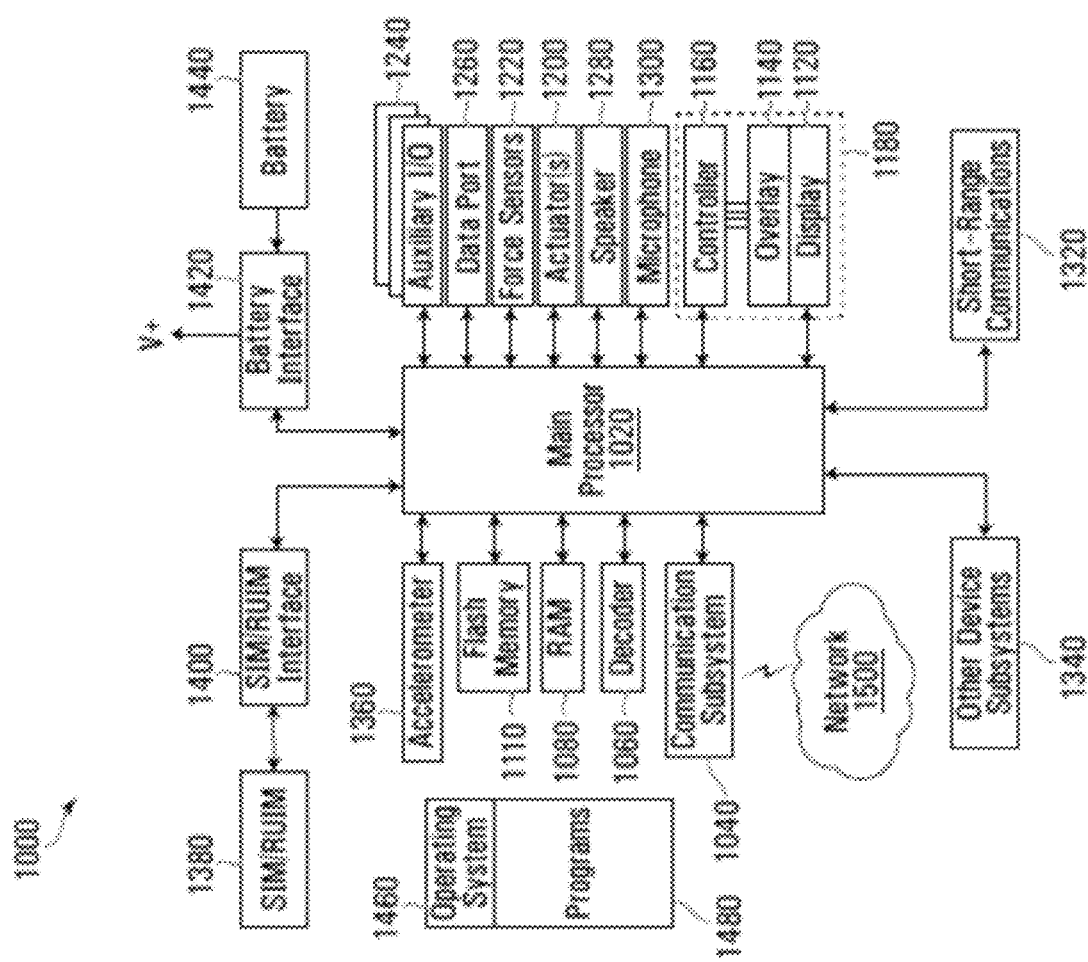
FIG. 2 is a system diagram of a computing device, for use with a thermal inspection system, according to an embodiment.

Referring now to FIG. 2, FIG. 2 shows a simplified block diagram of components of a computing device 1000, such as a mobile device or portable electronic device, according to an embodiment. Software modules described in the disclosure herein may be configured to run on a computing device, such as device 1000 of FIG. 2. The device 1000 includes multiple components such as a processor 1020 that controls the operations of the device 1000. Communication functions, including data communications, voice communications, or both may be performed through a communication subsystem 1040. Data received by the device 1000 may be decompressed and decrypted by a decoder 1060. The communication subsystem 1040 may receive messages from and send messages to a wireless network 1500.

The wireless network 1500 may be any type of wireless network, including, but not limited to, data-centric wireless networks, voice-centric wireless networks, and dual-mode networks that support both voice and data communications.

The device 1000 may be a battery-powered device and as shown includes a battery interface 1420 for receiving one or more rechargeable batteries 1440.

The processor 1020 also interacts with additional subsystems such as a Random Access Memory (RAM) 1080, a flash memory 1100, a display 1120 (e.g. with a touch-sensitive overlay 1140 connected to an electronic controller 1160 that together comprise a touch-sensitive display 1180), an actuator assembly 1200, one or more optional force sensors 1220, an auxiliary input/output (I/O) subsystem 1240, a data port 1260, a speaker 1280, a microphone 1300, short-range communications systems 1320 and other device subsystems 1340.

In some embodiments, user-interaction with the graphical user interface may be performed through the touch-sensitive overlay 1140. The processor 1020 may interact with the touch-sensitive overlay 1140 via the electronic controller 1160. Information, such as text, characters, symbols, images, icons, and other items that may be displayed or rendered on a portable electronic device generated by the processor 102 may be displayed on the touch-sensitive display 118.

The processor 1020 may also interact with an accelerometer 1360 as shown in FIG. 2. The accelerometer 1360 may be utilized for detecting direction of gravitational forces or gravity-induced reaction forces.

To identify a subscriber for network access according to the present embodiment, the device 1000 may use a Subscriber Identity Module or a Removable User Identity Module (SIM/RUIM) card 1380 inserted into a SIM/RUIM interface 1400 for communication with a network (such as the wireless network 1500). Alternatively, user identification information may be programmed into the flash memory 1100 or performed using other techniques.

The device 1000 also includes an operating system 1460 and software components 1480 that are executed by the processor 1020 and which may be stored in a persistent data storage device such as the flash memory 1100. Additional applications may be loaded onto the device 1000 through the wireless network 1500, the auxiliary I/O subsystem 1240, the data port 1260, the short-range communications subsystem 1320, or any other suitable device subsystem 1340.

For example, in use, a received signal such as a text message, an e-mail message, web page download, or other data may be processed by the communication subsystem 1040 and input to the processor 1020. The processor 1020 then processes the received signal for output to the display 1120 or alternatively to the auxiliary I/O subsystem 1240. A subscriber may also compose data items, such as e-mail messages, for example, which may be transmitted over the wireless network 1500 through the communication subsystem 1040.

For voice communications, the overall operation of the portable electronic device 1000 may be similar. The speaker 1280 may output audible information converted from electrical signals, and the microphone 1300 may convert audible information into electrical signals for processing.

Figure 3:
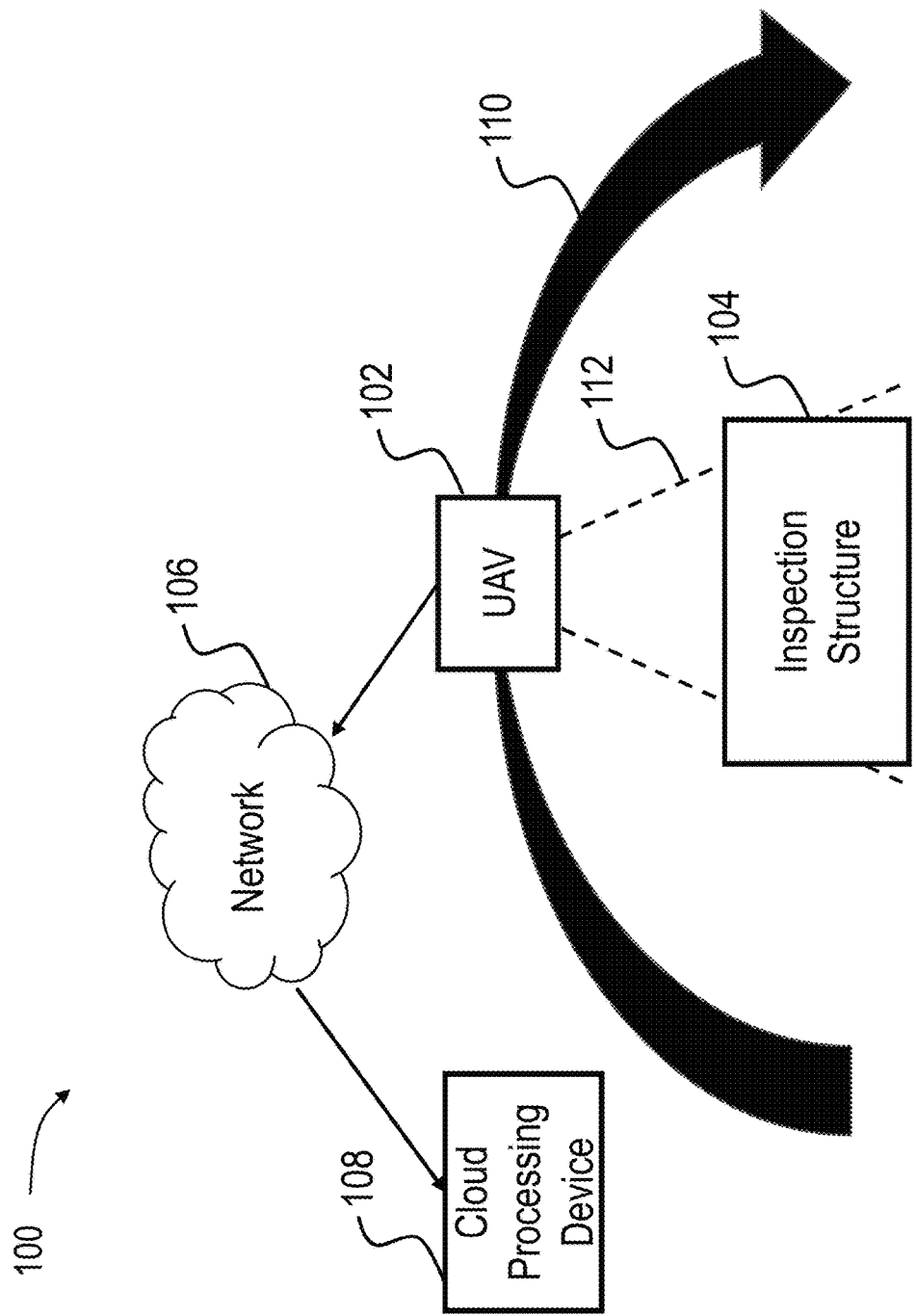
FIG. 3 is a system diagram of a thermal inspection system, according to another embodiment.

Referring now to FIG. 3, pictured therein is a system block diagram of thermal inspection system 100. System 100 may correspond to systems 10 and 1000 of FIGS. 1 and 2. System 100 includes UAV 102, inspection structure 104, network 106, and cloud processing device 108.

UAV 102 is an unmanned aerial vehicle. UAV 102 may comprise a multi-rotor unmanned aircraft, such as a quadcopter. UAV 102 may be configured to conduct autonomous flights with predetermined flight paths 110. For example, UAV 102 may be programmed to take off from a launch location, fly upwards 2 m, forwards 4 m, backwards 4 m, and downwards 4 m to land, such that UAV 102 is back at its original position. Similarly, UAV 102 may be preprogrammed to fly a certain pre-determined path around a building.

UAV 102 may comprise a UAV compatible with dual synchronized payload, and a UAV comprising advanced flight controller systems, 6 directional sensing and positioning, a first person view camera, collision mitigation system, radar, return-to-home, obstacle sensing, artificial intelligence based spot-check, awareness of nearby aircraft, auxiliary lights for night operation, and hot swappable batteries. Inspection structure 104 is any building or structure known in the art wherein thermal insulation performance may be of interest. For example, inspection structure 104 may be a permanent concrete building, a modular building, a mobile home, or other structure having an interior volume, wherein the interior volume is to be maintained at a temperature other than the external environmental temperature.

UAV 102 may be configured to fly a predetermined flight path 110 around inspection structure 104, and capture images (thermal and visible light) of all external surfaces or a subset of the external surfaces of inspection structure 104 (e.g. see imaging field of view 112 of FIG. 3). In some examples, images may be captured from inside the inspection structure 104. "Captured images", as used herein, collectively refers to both thermal and visible light images.

Flight path 110 may include position and time data for the entire flight, as well as UAV 102 orientation throughout the entire flight. Flight path 110 may be preprogrammed by a skilled operator, assisted by flight planning software. Flight path 110 data may be stored in electronic form and provided to UAV 102. In some examples, an external operator terminal, or controller (e.g. device 16 of system 10) may be used to transmit flight path 110 data to UAV, over a network (e.g. network 18 of system 10).

In other embodiments, instead of a pre-configured flight path, the UAV 102 may be flown manually by a skilled operator. In some embodiments, instead of capturing data with a UAV, a stationary imaging system may be utilized for the herein systems and methods.

Figure 4:
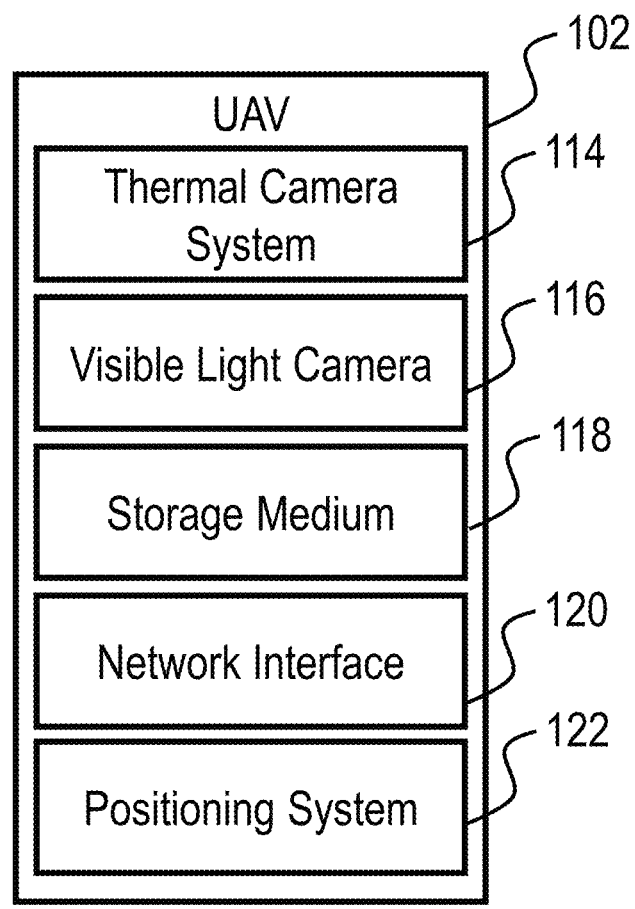
FIG. 4 is a system block diagram of the UAV of the thermal inspection system of FIG. 3, according to an embodiment.

Referring now to FIG. 4, shown therein is a system block diagram detailing components of UAV 102. UAV 102 further comprises a thermal camera system 114, visible light camera 116, storage medium 118, network interface 120, and positioning system 122.

Thermal camera system 114 includes at least one thermal camera. The thermal camera may capture thermal images in the infrared electromagnetic radiation band, including wavelengths between 1000 nm and 14000 nm. Each pixel of each captured thermal image may correspond to an intensity of received infrared radiation.

Thermal camera system 114 may be calibrated, such that each captured pixel may correspond to a temperature value. For example, a thermal image may include 1024×1024 pixels, capturing a specific scene. The top left pixel of the image may correspond to a 25 degree Celsius reading, while each neighboring pixel may correspond to a 24 degree Celsius reading. Such thermal correlation of captured data may be conducted at the firmware level of thermal camera system 114 or otherwise at a low hardware level of thermal camera system 114.

All captured thermal images may be stored on storage medium 118. Captured thermal images may be additionally associated with metadata when stored on storage medium. Such metadata may include, for example, time of capture, UAV position and orientation at time of capture, ambient temperature at the time of capture and associated visible light images. Additional metadata may be captured which may not be associated with any specific or particular images, for example, without limitation, times and dates, flying time per session, latitude, longitude, height, height max, speed, rotational speed of each motor, speed components in the x, y, and z directions, pitch, yaw, roll, list of comments from flight controller, GPS data, number of GPS satellites, battery history, ambient temperature data, flight path, takeoff history and landing history.

Visible light camera 116 may capture images in the visible light electromagnetic radiation band, including wavelengths between 400 nm and 700 nm. Visible light camera 116 may capture images of a minimum resolution of 640 pixels by 512 pixels. In other examples, visible light camera 116 may capture images with different resolutions, such as 4K resolution. Visible light cameras with greater resolutions may provide for greater precision and/or performance.

Visible light camera 116 may be coupled to UAV 102 through a gimbal, allowing for the relative position of visible light camera 116 and UAV 102 to be varied. Such a gimbal may allow for rotation at a rate of 100° per second, and a rotational range of +330° to −330°, +135° to −45°, and +25° to −90° in the pan, tilt and roll directions respectively. In some examples, the gimbal may be configured to operate in environments between −20° C. and +50° C.

All captured visible light images may be stored on storage medium 118. Captured visible light mages may be additionally associated with metadata when stored on storage medium 118. Such metadata may include, for example, time of capture, UAV position and orientation at time of capture, ambient temperature at the time of capture, and associated thermal images.

Storage medium 118 comprises any non-transient computer readable memory known in the art. Storage medium 118 may be, without limitation, a hard drive, solid state drive, NAND flash, or tape drive.

Network interface 120 may include any device, hardware, module or system that may enable UAV 102 to communicate with another electronic device, such as a computer system, and transmit data to such devices. Network interface 120 may comprise a RF transmission subsystem. Network interface 120 may be configured to enable UAV 102 to transmit data over GSM, LTE, HSPA, 5G or other cellular networks, Wi-Fi networks, satellite data networks, or any other communication network known in the art.

Positioning system 122 may include a plurality of sensors (e.g. GPS, GLONASS, accelerometers, gyroscopes, barometers and other sensors) as well as processing devices, which may generate a position and orientation data output. The position and orientation data may include a latitude, longitude, elevation and orientation data. In other examples, the position and orientation data may comprise a relative orientation and position output. For example, position may be specified relative to inspection structure 104, such as X, Y, Z coordinates relative to a central point of inspection structure 104. Similarly, orientation may be specified in relation to camera fields of view and external surfaces of inspection structure 104.

In some examples, positioning system 122 may be further configured to capture and record environmental data, such as ambient temperature, and ambient barometric pressure.

Positioning system 122 may be configured to output and store timestamped position and orientation data at regular intervals. For example, through interaction with an internal clock, position and orientation data may be output at an interval of 1000 samples per second. In other examples, position and orientation data may be outputted and stored at different intervals, or at the same intervals as image captures, such that a corresponding position and orientation data sample exists for every captured image.

Referring to FIG. 3, UAV 102 is configured to conduct an autonomous flight around inspection structure 104, with a pre-determined flight path 110. Flight path 110 may be configured based on the field of view 112 of visible light camera 116 and thermal camera 114. For example, flight path 110 may include a spiral path around a generally cube shaped structure. Flight path 110 may include orientation directions of the UAV 102, such that imaging equipment of UAV 102 (thermal camera system 114, visible light camera 116) is directed towards external surfaces of inspection structure 104 (or internal surfaces, in examples wherein inspection is conducted internally).

During UAV 102 flight according to flight path 110, UAV 102 may simultaneously (in a synchronized configuration) capture visible light images and thermal images of structure 104 using visible light camera 116 and thermal camera 114 respectively.

Images may be captured at a rate such that images captured are just partially overlapping. For example, if flight path 110 includes a perfectly horizontal flight portion, images may be captured such that the right-most 10% of a first image, and the left-most 10% of a second image overlap. Similarly, when images of structure 104 above the portions of structure 104 above first image and second image are captured, upper portions of first image and second image may overlap with lower portions of subsequent images. These overlapping images may be stitched together into continuous images by any number of image stitching algorithms and methods known in the art.

Image capture rate may be proportional to UAV 102 flight speed. For example, image capture rate be determined by calculating, through knowledge of image capture fields of view and UAV 102 flight speed, image capture frequency that results in a specific amount of image overlap.

Images from both camera systems may be captured along flight path 110 until images of every exterior surface and portion of structure 104 has been captured. In some examples, only certain portions of structure 104 may be of interest, or some portions of structure 104 may not be easily surveyed by the method described herein (e.g. line of site access is difficult or unavailable to a typical UAV 102).

In some embodiments, the UAV 102 may be flown a minimum of 3 hours after and/or before sunset to reduce the effect of sun exposure on captured thermal images. In some embodiments, UAV 102 may be flown when ambient temperatures are below 12 degrees Celsius. In some examples, exterior and interior ambient temperatures at the time of image capture may be measured and recorded for further processing.

Once all of these images have been captured, they may be transmitted to cloud processing device 108 through network 106. Additionally, all associated metadata (e.g. position and orientation data, environmental data, other metadata, etc.) may be transmitted to cloud processing device 108 through network 106.

In some examples, all captured images and metadata (e.g. ambient temperature data) may be transmitted after the completion of the UAV 102 flight. Such an arrangement may reduce energy consumption of the UAV 102 (by reducing network usage), increasing UAV 102 flight range.

In other examples, captured images and metadata may be transmitted as soon as they have been captured. Such an arrangement may reduce waiting time needed between the end of the flight and data processing, and may reduce storage medium 118 capacity requirements, as only a storage buffer is required, as images may be deleted from storage medium 118 as soon as they have been transmitted to cloud processing device 108.

Figure 5:
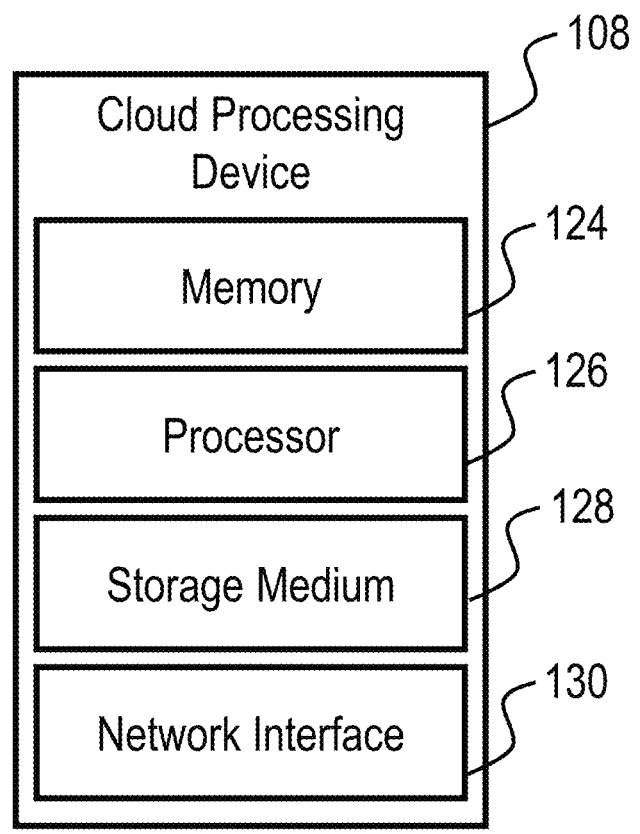
FIG. 5 is a system block diagram of the cloud processing device of the thermal inspection system of FIGS. 3 and 4, according to an embodiment.

Referring now to FIG. 5, shown therein is a detailed system block diagram of cloud processing device 108. Cloud processing device 108 includes memory 124, processor 126, storage medium 128 and network interface 130. Cloud processing device 108 may be an x86 or ARM architecture server, computer, or microcontroller.

Cloud processing device 108 in some examples may be an instance of a commercially provided cloud computing service, such as Amazon Web Services, Google Cloud Platform, Microsoft Azure or other commercial or privately provided cloud computing platforms. In such examples, subcomponents of cloud processing device 108 such as memory 124, processor 126, storage medium 128 and network interface 130 may be virtualized instances of such components.

Memory 124 comprises any memory known in the art that may temporarily store data (e.g. machine instructions, input data, and output data) for use, input and output of a computer processor (e.g. processor 126).

Processor 126 may be any processor known in the art that may receive processor architecture specific machine instructions and execute these received instructions. Processor 126 may be a x86, ARM or other architecture general purpose processor or any other computer processor known in the art.

Storage medium 128 comprises any non-transient computer readable memory known in the art. Storage medium 128 may be, without limitation, a hard drive, solid state drive, NAND flash, or tape drive.

Network interface 130 may include any device, hardware, module or system that may enable cloud processing device 108 to communicate with another electronic device, such as a computer system, and transmit data to such devices. Network interface 130 may be configured to enable cloud processing device to transmit data over the Internet or other networks through GSM, LTE, HSPA, 5G or other cellular networks, Wi-Fi networks, satellite data networks, wired ethernet networks, or any other communication network known in the art. Network interface 130 may enable cloud processing device 108 to communicate with other cloud computing devices or instances, within the same network or platform, or other networks or platforms.

Figure 6:
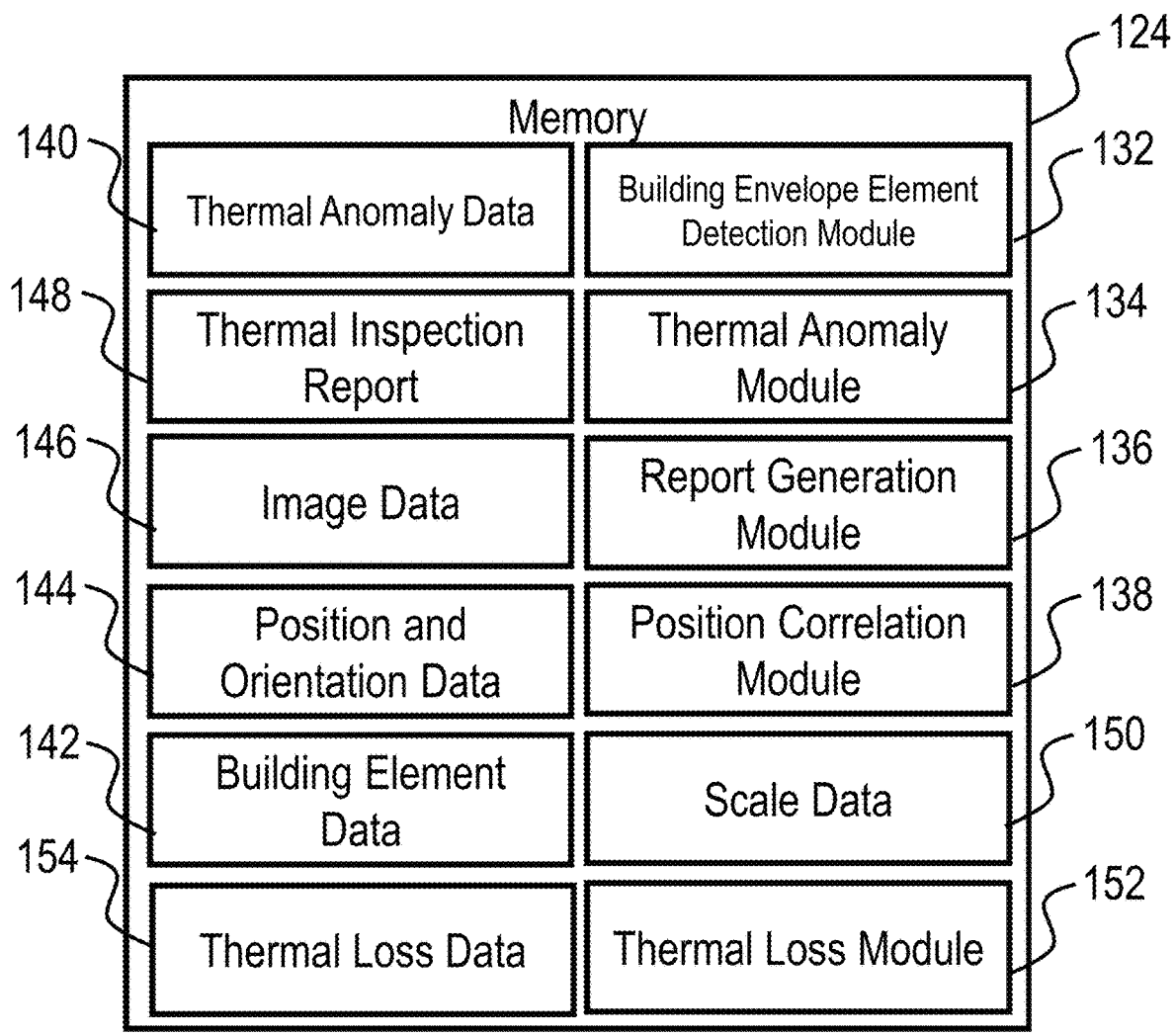
FIG. 6 is a system block diagram of the memory of the cloud processing device of FIGS. 3 to 5, according to an embodiment.

Referring now to FIG. 6, pictured therein is a detailed system block diagram of memory 124. Memory 124 may include building envelope element detection module 132, thermal analysis module 134, report generation module 136, position correlation module 138, thermal anomaly data 140, building element data 142, position and orientation data 144, image data 146, thermal inspection report 148, scale data 150, thermal loss data 154 and thermal loss module 152. In some examples, software modules and data shown included within memory 124 may be stored in other portions of system 100. For example, software modules and data of memory 124 may be stored in storage medium 128 for long term storage, and may be copied onto memory 124 as needed, and vice versa. In some examples, data types pictured within memory 124 may only be present after certain portions of the inspection process described herein have been completed. For example, thermal inspection report 148 may not be present on memory 124 until the cloud processing device has processed data collected by UAV 102, and generated the thermal inspection report 148, as described herein.

Position correlation module 138 comprises a software module configured to receive thermal image data, visible light image data, and position and orientation data 144 from UAV 102, and determine the scale and orientation of each thermal image, and visible light image. By assessing the distance between the inspection structure 104, and considering the known field of view of the thermal camera and visible light camera, and the relative orientation of the inspection structure 104, and UAV 102, scale data 150 may be determined for each image. Scale data 150 may include data describing the distance that each pixel corresponds to within each image (thermal or visible light).

In some examples, scale data 150 may be uniform across a single captured image, or may vary across each image. In examples wherein scale data 150 varies across each image, scale data 150 may comprise a scale map, wherein the differing scales values may be described, each corresponding to different regions of the image.

In some examples, instead of storing scale data 150 separately from images, images may be modified to incorporate scale data, such as writing scale data 150 to image metadata.

In some examples, each image may be warped, or stretched, such that the scale is uniform across the entire image. Due to a non-direct image capture angle, the lower portions of a captured image may include comprise a different scale than upper portions of the image. The contents of each image may be stretched such that each pixel within the image represents the same linear distance (e.g. each pixel corresponds to a distance of 0.01 m).

In some examples, position correlation module 138 may be further configured to determine the relative position of the subject matter of each thermal image and visible light image, such that the images may be oriented in three-dimensional space. For example, such positional data may be combined with the images in order to generate a 3D model or representation of the inspection structure 104. 3D models may be generated using photogrammetric analysis. Two-pixel ground sampling distance (GSD) may be applied in the X, Y directions and three pixels GSD in the Z direction to generate a 3D model, digital surface models and an orthomosaic map. Such models and maps may be used to map, measure, and document the progress of thermal inspection operations conducted using the systems and methods described herein.

In some examples, relative positions may be determined to sub centimeter accuracy, wherein at least 250 images are captured. In other examples, other numbers of images may be captured to provide for sub centimeter accuracy.

Building envelope element detection (BEED) module 132 comprises a software module configured to receive thermal images, visible light images, and scale data, and detect building elements within these images. In some examples, BEED module 132 may be referred to as Smart Envelope Element Recognition (SEER).

Building envelope element detection module 132 is first configured to stitch both visible light images and thermal images together into larger continuous images, providing for a wholesome view of the inspection structure 104. Any image stitching method or algorithm known in the art may be applied to stitch the image together.

Figure 7:
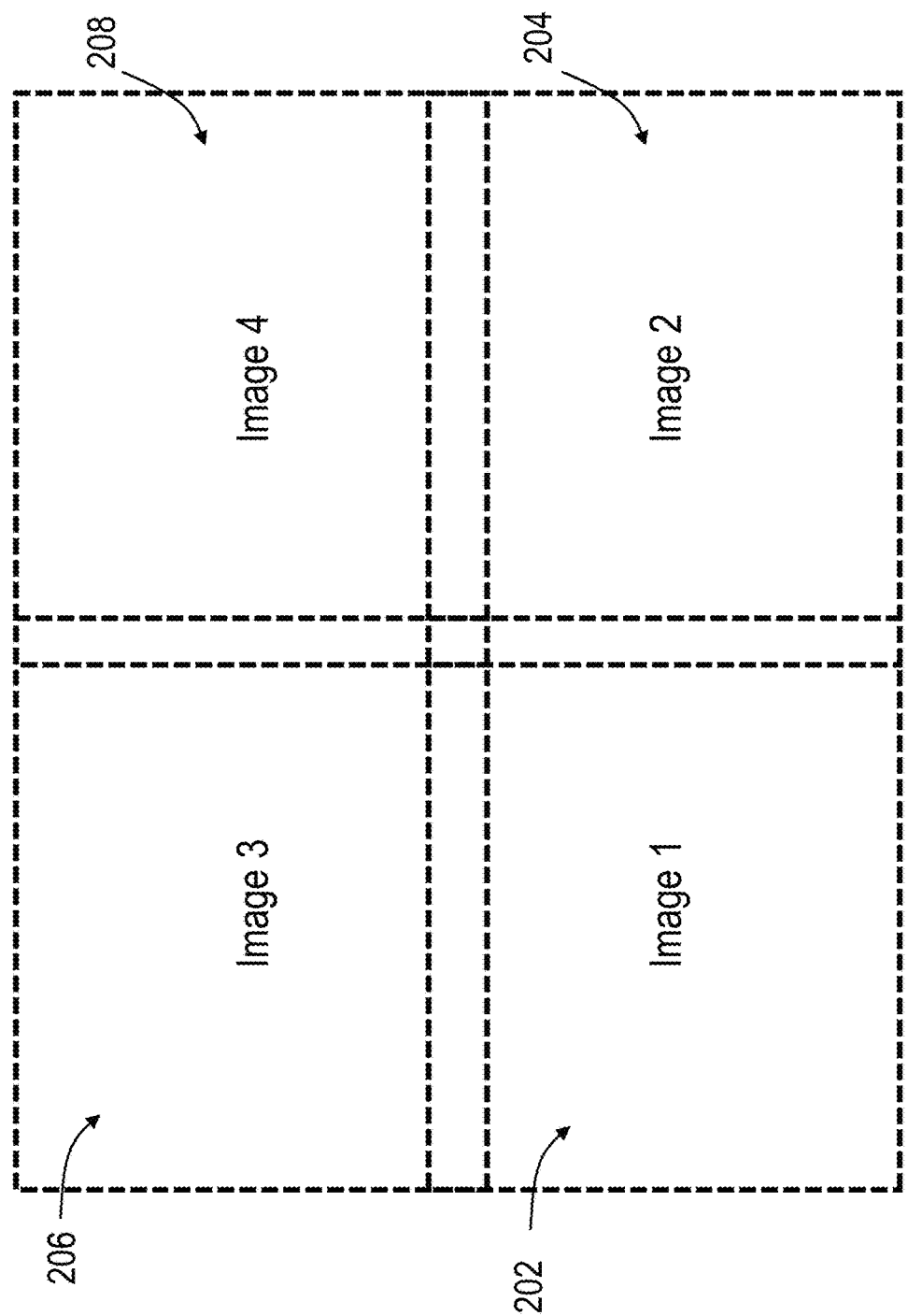
FIG. 7 is a depiction of an image stitching operation before stitching, as may be applied by the thermal inspection system of FIGS. 3 to 6, according to an embodiment.

Referring now to FIG. 7, shown therein is an image stitching operation, such as may be applied by BEED module 132. Four images, image 1 202, image 2 204, image 3 206 and image 4 208 are captured such that the subject matter of each bordering image is overlapping.

Figure 8:
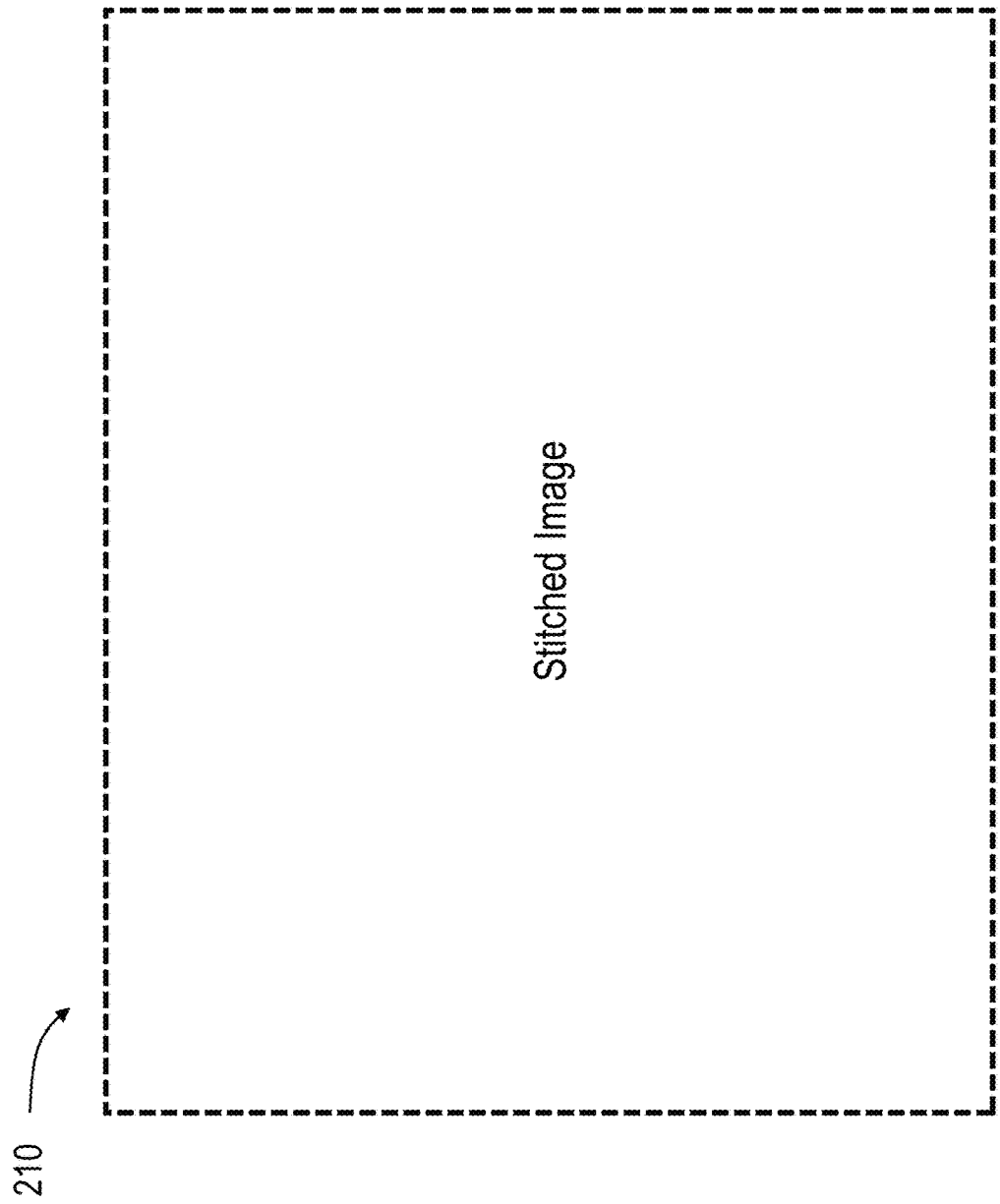
FIG. 8 is a depiction of an image stitching operation after stitching, as may be applied by the thermal inspection system of FIGS. 3 to 6, according to an embodiment.

Referring now to FIG. 8, shown therein is the result of the image stitching operation of FIG. 7, wherein image 1 202, image 2 204, image 3 206 and image 4 208 were stitched together into a single, larger image, including the contents of all four constituent images.

After image stitching, stitched images may be stored in memory 124 or storage medium 128 (e.g. as image data 146).

Once images have been stitched into larger, continuous images, building elements within the stitched images may be identified. Building elements may include structural or functional features, such as, without limitation, windows, doors, vents, window frames, solid walls, roof panels, roof elements or other building elements.

BEED module 132 may apply machine learning or artificial intelligence methods, such as supervised, unsupervised, or semi-supervised learning to detect building elements. In one example, BEED module 132 may receive visible light images, thermal images, and scale data 150 as an input, provide these inputs to a trained neural network, and receive building element data 142 as an output from the trained neural network.

BEED module 132 may include a neural network configured to receive input data (thermal images, visible light images, and scale data 150) and generate at least one output (building element data 142). The neural network may be a feed-forward neural network. The neural network may have a plurality of processing nodes. The processing nodes may include a multi-variable input layer having a plurality of input nodes, at least one hidden layer of nodes, and an output layer having at least one output node. During operation of the neural network, each of the nodes in the hidden layer applies an activation/transfer function and a weight to any input arriving at that node (from the input layer or from another layer of the hidden layer). The node may provide an output to other nodes (of a subsequent hidden layer or to the output layer). The neural network may be configured to perform a regression analysis providing a continuous output, or a classification analysis to classify data. The neural networks may be trained using supervised or unsupervised learning techniques, as described below.

According to a supervised learning technique, a training dataset is provided at the input layer in conjunction with a set of known output values at the output layer. During a training stage, the neural network may process the training dataset. It is intended that the neural network learn how to provide an output for new input data by generalizing the information it learns in the training stage from the training data. Training may be effected by back propagating the error to determine weights of the nodes of the hidden layers to minimize the error. Once trained, or optionally during training, test or verification data can be provided to the neural network to provide an output. A neural network may thus cross-correlate inputs provided to the input layer to provide at least one output at the output layer. The output provided by a neural network in each embodiment is preferably close to a desired output for a given input, such that the neural network satisfactorily processes the input data.

Once building elements have been detected, as described above, a bounding box may be defined around each detected building element. Bounding boxes may include coordinates of the bounding box. Additionally, for each identified building element, a class label may be associated with the detected building element. Class labels may include, for example, windows, doors, vents, window frames, solid walls, roof panels, roof elements or other building elements. Bounding box data, and class label data may be stored as building element data 142.

Figure 9A:
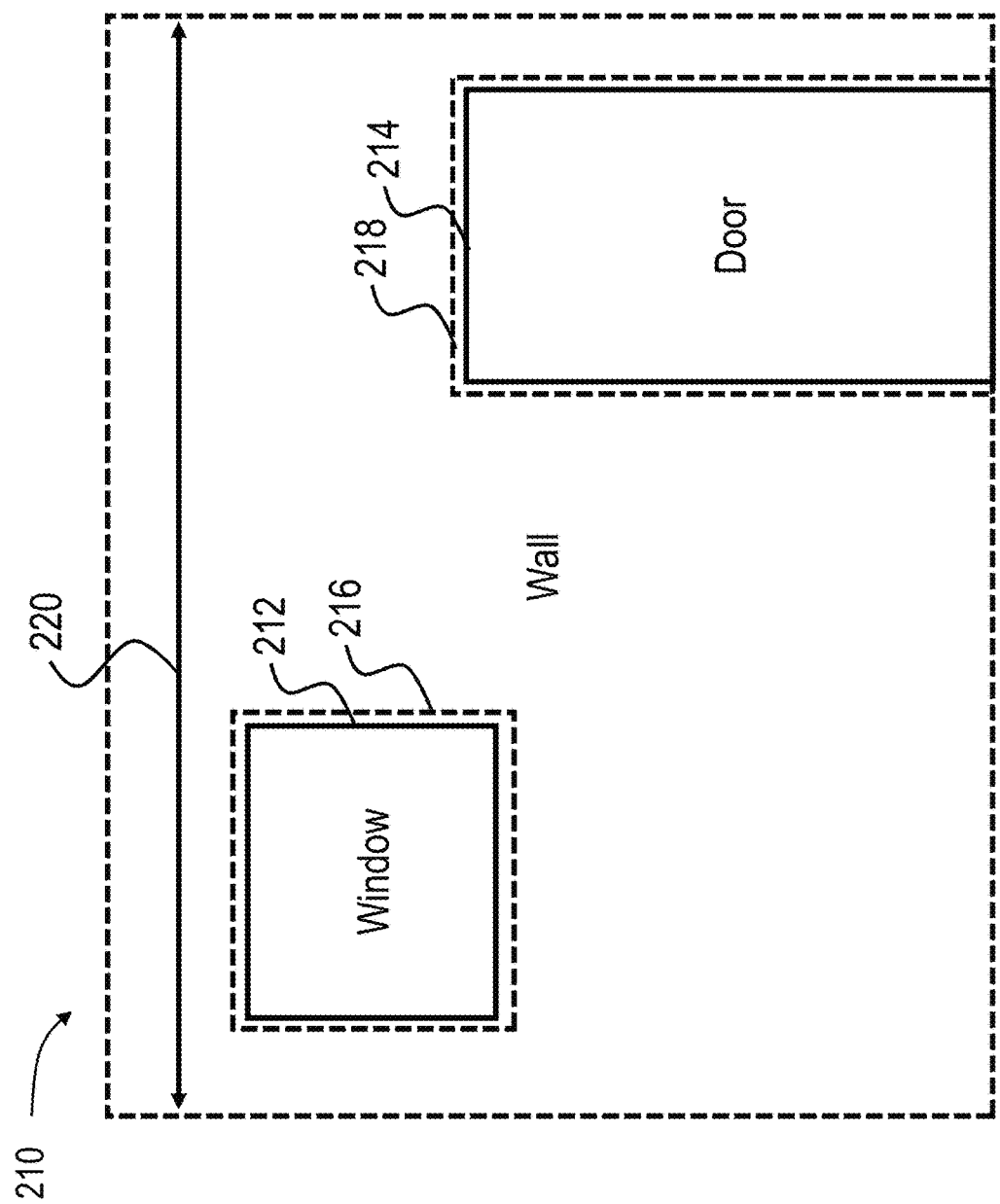
FIG. 9A is a depiction of the output of a building envelope element detection process, as may be applied by the thermal inspection system of FIGS. 3 to 6, according to an embodiment.

Referring now to FIG. 9A, shown therein is an example visible light image 210, including a competed BEED process applied to the image 210. Within image 210, therein is a window 212, a door 214 and a wall. BEED module 132 has processed image 210, such that building elements within image 210 have been detected, located and classified. Surrounding window 212 is bounding box 216, denoting the boundary of window 212 within image 210. Similarly, surrounding door 214 is bounding box 218, denoting the boundary of door 214 within image 210. Additionally, text format class labels are visible within each bounding box, labelling each element with a class ("window" and "door" for box 216 and 218 respectively). Additionally pictured in FIG. 9A is scale 220, which corresponds to the linear distance across the image 210, which may be derived from scale data 150.

The example of FIG. 9A shows a graphical representation of a BEED module 132 processed image, however, the associated building element data 142 may be stored in other formats. For example, building element data 142 may be stored as plain text data, or other structured data (e.g. XML format data) including the associated image for the building element data, and bounding box location, bounding box size, and element class label for each located building element. Such data may be easily machine read for further analysis and processing.

Element classes may comprise elements including "wall", "roof", "window" "door" and "others", wherein "others" includes ground and sky images. In some examples, element classes may further comprise sub-classes. For example, a "window" class element may further comprise a sub-class of "single pane", "double pane", "triple pane", "argon filled", "nitrogen filled", and other sub-classes.

Referring again to FIG. 6, thermal anomaly module 134 comprises a software module configured to receive building element data 142 from BEED module 132, as well as both thermal images and visible light images (e.g. image data 146), and scale data 150 as an input, and generate thermal anomaly data 140 as an output.

Thermal anomaly module 134 may consider previously generated building element data 142 to apply different detection methods to differing building elements. For example, building element data 142 may denote certain regions of the captured images as "windows" or "doors", as described previously. Such detected regions may be assessed differently for thermal anomalies. In some examples, image areas not associated with a detected building element may be assessed in a default manner.

Certain thermal defects may be present within a typical window, and each thermal defect may be associated with a specific thermal signature. For example, multi-pane windows may possess a thermal defect wherein the inert gas between panes leaks out, introducing air and or moisture between the windowpanes. This may affect the thermal performance of the window. Thermal anomaly module 134 may be particularly configured to detect the thermal signature of such a thermal defect within regions labelled by BEED module 132 as window regions. Similarly, specific, known defects may exist for other building elements. For such elements, image regions associated with known building elements, may be assessed according to their building element class.

In some examples, thermal anomaly module 134 may apply a step-walk process to thermal and/or visible light images to detect thermal anomalies.

Figure 9B:
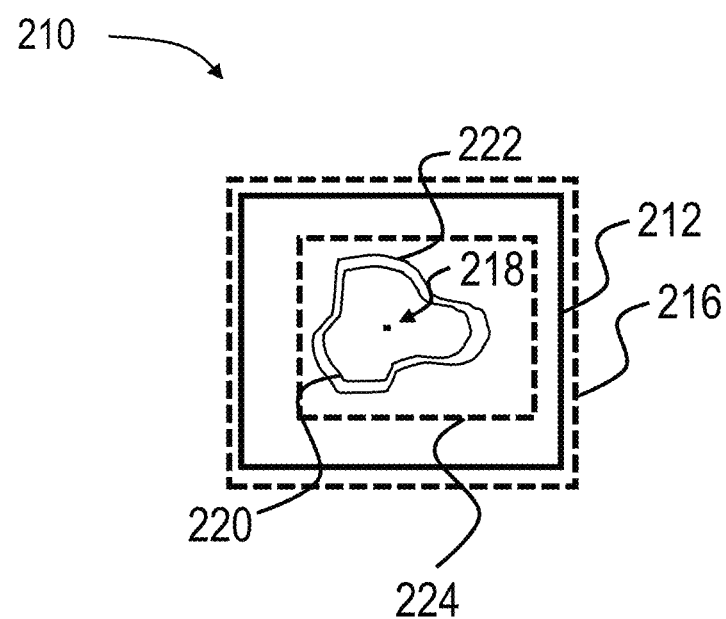
FIG. 9B is a depiction of a thermal anomaly detection process, as may be applied by the thermal inspection system of FIGS. 3 to 6, according to an embodiment.

Referring now to FIG. 9B, pictured therein is a depiction of example of a step-walk process according to an embodiment. In the examples of FIG. 9B, the step walk process is applied to window 212 of image 210. Provided to the step-walk process is a temperature threshold ("max walk") parameter, as well as a maximum step size ("max step") parameter. Provided parameters may be provided by a human operator interacting with an input device such as a keyboard, mouse, or touch display. Thermal anomaly module 134 may locate the individual pixel with the highest temperature within the bounds of a single building element (e.g. window 212). For example, such a building element may be a specific window or door, as identified by BEED module 132. A boundary around each element may be determined, as described previously, and the highest temperature pixel within this boundary may be found. For example, in FIG. 9B, pixel 218 comprises the pixel with the highest temperature (17 degrees Celsius).

Figure 9C:
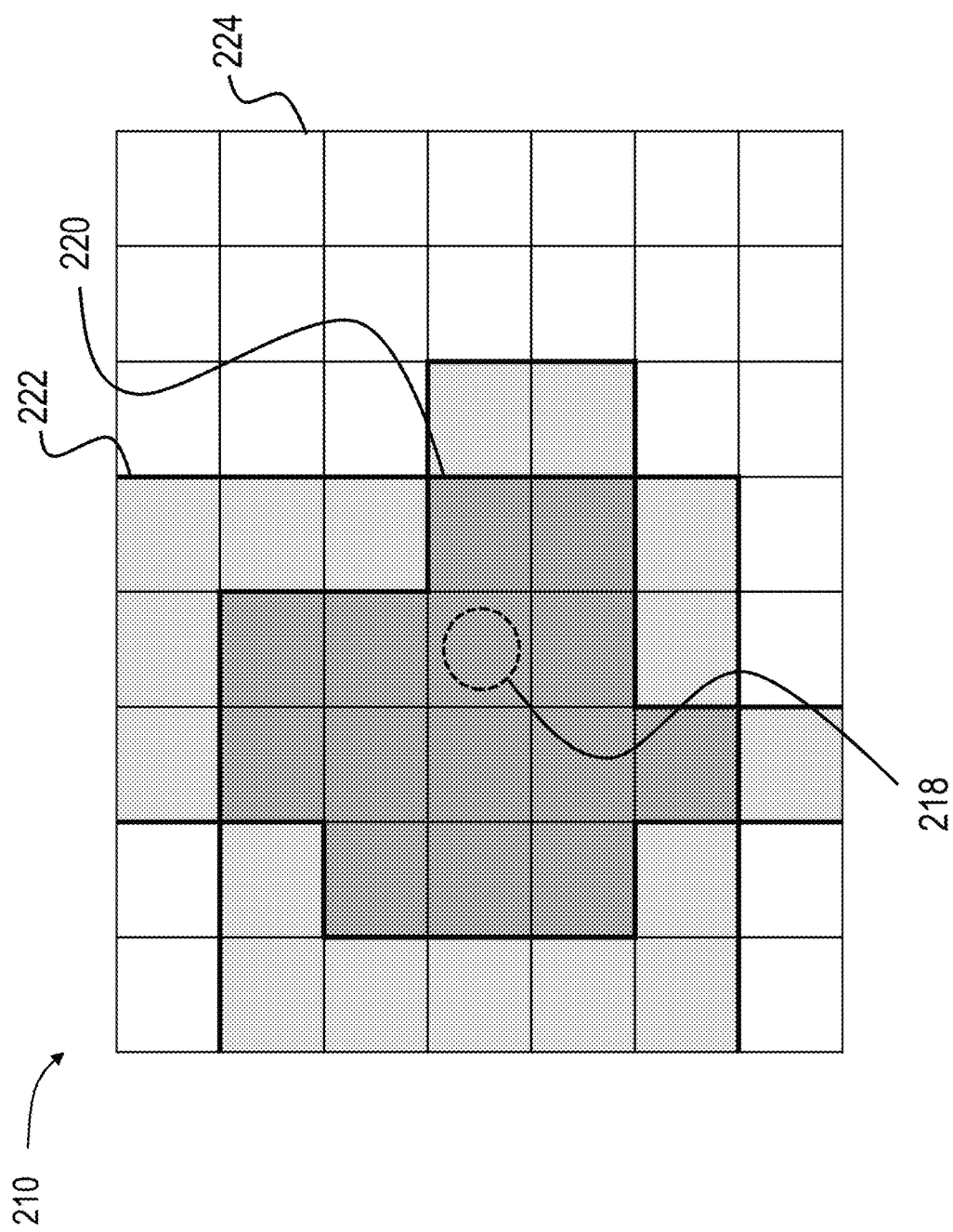
FIG. 9C is a depiction of a thermal anomaly detection process, as may be applied by the thermal inspection system of FIGS. 3 to 6, according to an embodiment.

Referring now to FIG. 9C, pictured therein is a detailed view of FIG. 9B, with individual pixels visible. The surrounding pixels of pixel 218, within the max walk parameter threshold will next be identified by the step-walk process. For example, if the max walk is specified as 5, the continuous pixel area within 5 degrees Celsius bordering the maximum temperature pixel will be identified. In FIG. 9C, this continuous area is identified as region 220. Next, this continuous pixel region 220 may be expanded by a number of pixels, according to the defined max step parameter. For example, if the max step parameter is 1, the continuous pixel area will be expanded by one pixel in each direction. In FIG. 9C, the expanded pixel area 222 is visible, wherein the max step parameter is equal to 1.

After the identification and expansion of this expanded pixel area 222, a contour may be defined around this pixel area, as shown in FIG. 9C. Next, this contour defined region (expanded pixel area 222) may be analyzed to identify the area as a thermal anomaly. The shape of this area 222 may be analyzed and/or compared to the shapes of known thermal anomalies. If the shape of this area matches the shape of a known thermal anomaly, the area may be identified as a thermal anomaly, using methods as described previously. If this shape does not match the shape of a known thermal anomaly, expanded pixel area 222 will not be identified as a thermal anomaly.

In addition to the shape, the temperatures (absolute and relative to interior and exterior ambient temperatures may be identified) of the expanded pixel area 222 may be analyzed to identify the existence and nature of the thermal anomaly.

The existence, location and nature of thermal anomalies detected through the step-walk process described above may be stored as thermal anomaly data 140.

Thermal anomaly data 140 may include the location of each detected thermal anomaly, as well as a class label for each thermal anomaly. Thermal anomaly classes may include, without limitation, wall cracks, window seal failures, ceiling cracks, insulation failures, masonry failures, and more. Location of a thermal anomaly may be denoted by an associated image indicator, bounding box location (e.g. center location), and bounding box dimensions. Thermal anomaly data 140 may be of a machine-readable format, such as plain text, or XML, such that thermal anomaly data 140 may be further processed and/or analyzed.

Figure 10:
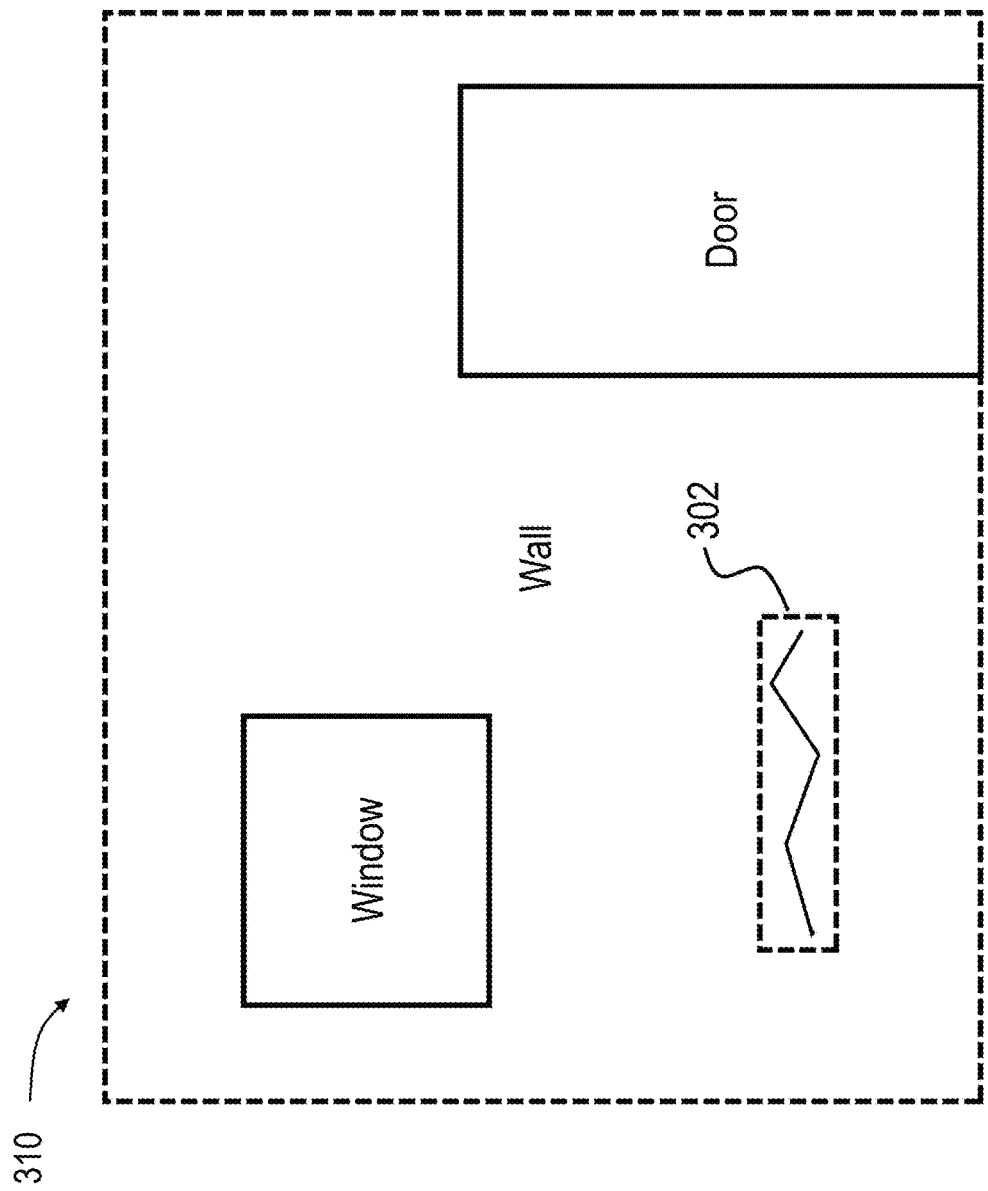
FIG. 10 is a depiction of the output of a thermal anomaly detection process, as may be applied by the thermal inspection system of FIGS. 3 to 6, according to an embodiment.

Referring now to FIG. 10, shown therein is an example thermal image 310, including a competed thermal anomaly detection process applied to the image 310. Within image 310, therein is a window and a door. BEED module 132 has processed image 310, such that building elements within image 210 have been detected, located and classified.

Thermal anomaly detection process has located a thermal anomaly 302 within image 310. Surrounding thermal anomaly 302 is a bounding box, denoting the boundary of thermal anomaly 302 within image 310. Thermal anomaly 302 is associated with a thermal anomaly class label (not pictured).

The example of FIG. 10 shows a graphical representation of a thermal anomaly module 134 processed image, however, the associated thermal anomaly data 140 may be stored in other formats. For example, thermal anomaly data 140 may be stored as plain text data, or other structured data (e.g. XML format data) including the associated image for the thermal anomaly data 140, and bounding box location, bounding box size, and element class label for each located thermal anomaly. Such data may be easily machine read for further analysis and processing.

Figure 11:
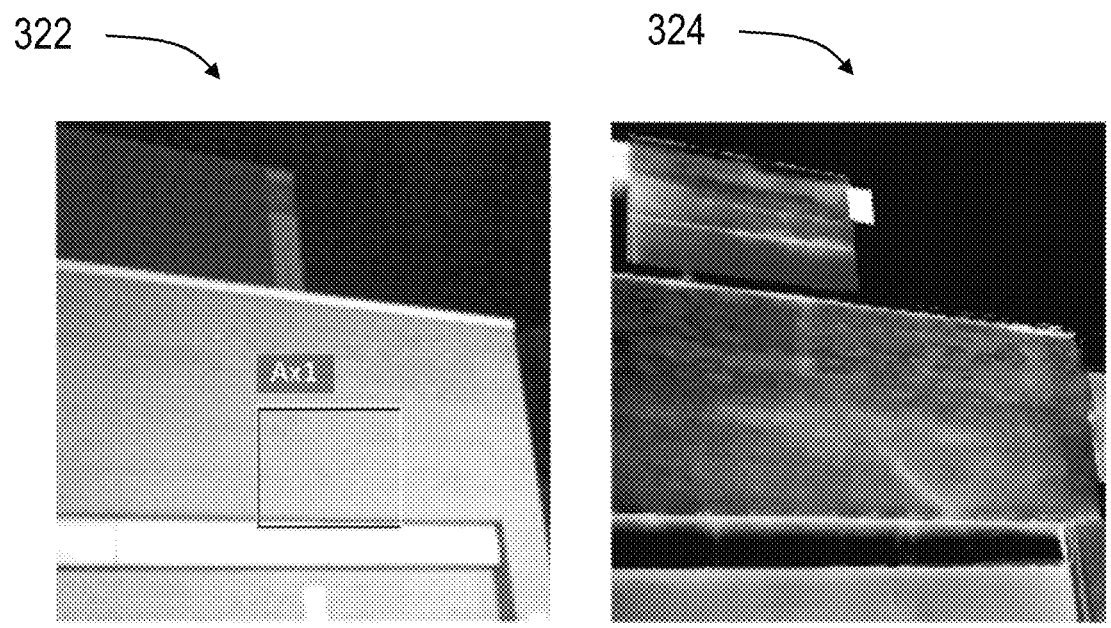
FIG. 11 is a side by side depiction a thermal image and visible light image of an inspection structure, as may be captured by the thermal inspection system of FIGS. 3 to 6, according to an embodiment.

Referring now to FIG. 11, shown therein is a side-by-side comparison of an example visible light image 322, and corresponding example thermal image 324. While not visible within visible light image 322, a thermal crack is depicted within thermal image 324. This thermal crack may be detected, located and classified by thermal anomaly module 134. Image 322, and 324 have been captured by a UAV.

Figure 12:
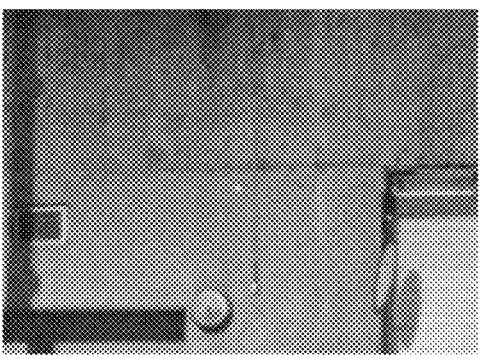
FIG. 12 is a side by side depiction a thermal image and visible light image of an inspection structure, as may be captured by the thermal inspection system of FIGS. 3 to 6, according to another embodiment.
Figure 12:
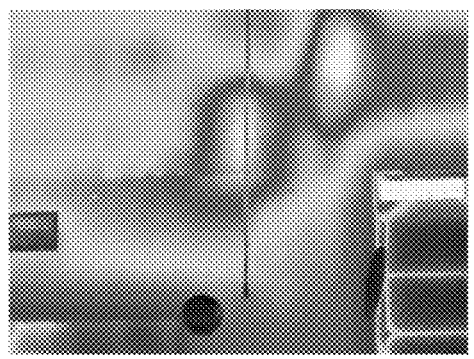

Referring now to FIG. 12 shown therein is a side-by-side comparison of an example visible light image 326, and corresponding example thermal image 328. While not visible within visible light image 322, a thermal defect is depicted within thermal image 324. This thermal defect may be detected, located and classified by thermal anomaly module 134, using a step-walk process as described herein. Image 326, and 328 have been captured by a UAV.

In other examples, other thermal defects may be present and may be detected. For example, defects may include, for a roof element: moisture accumulation within gravel, moisture accumulation within roofing membrane, inconsistent thermal layer, decay of insulation, decayed connection between roof and exterior wall, heat loss at overhang, heat loss at concrete pavers, heat loss to vegetation, no perimeter insulation, and heat loss at parapet. Defects may include, for a door element: heat loss through door frame, heat loss through door, heat loss through garage door, and heat loss at main floor enclosure. Defects may include, for a window element: moisture accumulation behind cladding and window frame, moisture accumulation within window frame, heat loss through uninsulated framing, heat loss through IGUs, heat loss through frame and IGUs, heat loss through caulking, heat loss through connection between wall and window, and skylight IGUs. Defects may include, for a curtain wall element: heat loss through uninsulated framing, and heat loss through IGUs. Defects may include, for a wall element: connection between foundation wall and exterior wall, connection between exterior walls at corners, connection at fasteners of cladding, thermal bridging through connections of building envelope, thermal bridging through framing, connection between exterior wall and roof assembly, inconsistent insulation, decay of insulation, connection between wall and window, thermal bridge between structural load bearing elements and other elements, connection between wall and floor slabs, connection between wall and garage door, connection between walls and doors, connection between siding joints, thermal brigge through overhand, thermal crack in wall assembly due to moisture, mosutre accumulation due to lack of ventilation, moisture accumulation between wall and window connection, and moisture accumulation due to lack of ventilation in metal siding. In other examples, other defect types may be present and/or detectable.

Referring back to FIG. 6, thermal loss module 152 comprises a software module configured to receive image data 146 and building element data 142 as an input, and generate thermal loss data 154 as an output. Thermal loss module 152 may receive ambient internal and external temperatures of the inspection structure, and estimate the heat loss rate across the building envelope of the inspection structure, using scientific and mathematical principles of heat transfer. According to some examples, heat loss rates may be calculated using the systems and methods described in U.S. Pat. No. 11,449,981, which is herein incorporated by reference in its entirety.

In some examples, thermal loss module 152 may be configured to estimate the thermal loss associated with each individual thermal defect. For example, using the same methods described above, the loss associated with the expanded pixel area 222 may be calculated. Additionally, the temperature profile of the expanded pixel area 222, in a variation wherein the thermal anomaly is not present may be estimated and/or generated. The thermal loss of this variation of the expanded pixel area 222 may be calculated according to the methods described above. These two thermal losses may be compared to determine the individual thermal loss impact of each located thermal anomaly.

According to some examples, the temperature profile of the expanded pixel area 222, in a variation wherein the thermal anomaly is not present may be estimated and/or generated using machine learning techniques. For example, an adversarial generative neural network may be applied to generate the variation wherein the thermal anomaly is not present in the thermal image. In other examples, the temperatures of pixels surrounding the expanded pixel area 222 may be used to estimate the average temperature of the variation of the expanded pixel area.

Thermal loss data 154 comprises data characterizing the heat loss rate of the thermal structure. Thermal loss data 154 may comprise a map corresponding to the building envelope of the inspection structure, detailing thermal loss rates according to each thermal image pixel associated with the building envelope, according to some examples. In other examples, thermal loss data 154 may comprise loss data according to each detected building element. In other examples, thermal loss data 154 may comprise loss data averaged across the inspection structure. In some examples, thermal loss data 154 may comprise individual thermal loss data for all thermal anomalies. Thermal loss data 154 may be stored in any suitable machine readable format.

Figure 13:
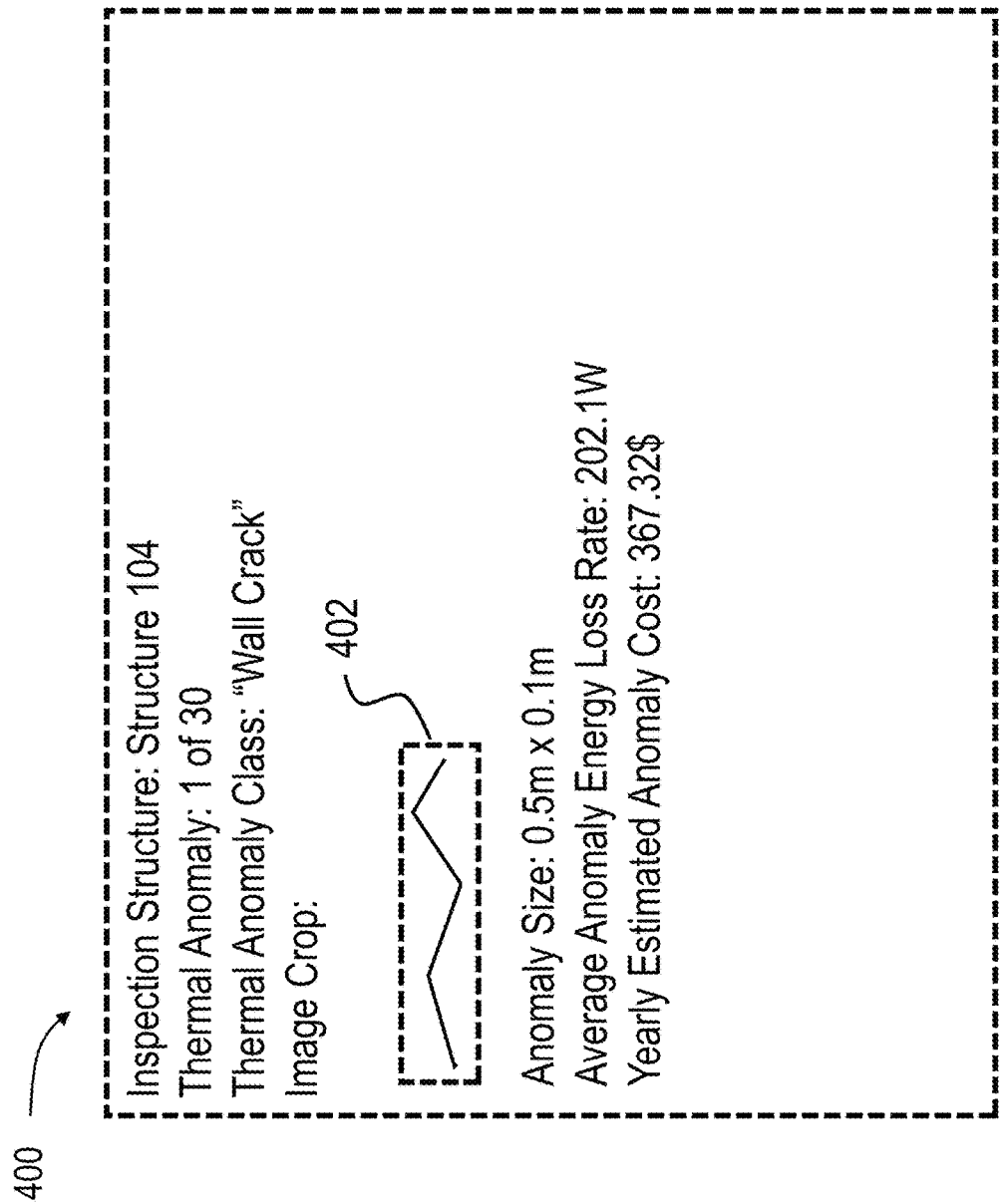
FIG. 13 is a depiction of a sample thermal inspection report, as may be generated by the thermal inspection system of FIGS. 3 to 6, according to an embodiment.

Report generation module 136 comprises a software module configured to receive thermal anomaly data 140 and image data 146 as an input, and output a thermal inspection report 148, associated with the inspection structure 104. The thermal inspection report (for example, thermal inspection report 400 as shown in FIG. 13) comprises data detailing the results of the thermal inspection. For example, thermal inspection report 148 may comprise a list of all located or suspected thermal anomalies, including location, classification (e.g. crack, moisture leakage, window seal failure or more) and other attributes, such as estimated heat loss.

In some examples, thermal inspection report may additionally include an estimated energy cost associated with the defect. For example, in addition to collected data, report generation module 136 may be provided with a heating type (e.g. forced air gas, electric, etc.), and energy cost, and may estimate the approximate financial cost associated with each located thermal anomaly.

In some examples, report generation module 136 may be additionally provided with more input data, such as inspection metadata, and environmental data.

Referring now to FIG. 13, pictured therein is a portion of a thermal inspection report 400, according to an embodiment. Thermal inspection report 400 includes data summarizing 30 located thermal anomalies. FIG. 13 pictures a summary of a single, located thermal anomaly, wall crack 402.

In the embodiment of FIG. 13, thermal inspection report 400 includes identification metadata of the inspection structure ("Structure 104"), thermal anomaly identifier ("1 of 30"), thermal anomaly class ("Wall Crack"), an image crop of the thermal anomaly, anomaly size data ("0.5 m×0.1 m"), anomaly energy loss rate ("202.1 W"), and yearly estimated anomaly cost ("$367.32").

In some examples, thermal inspection reports may include additional features and data, for example, without limitation: metadata such as inspection operator, or date and time of inspection, project identifier, inspection hardware identifiers, area inspected, total time of inspection, quality check data, preview thermal and visible light images, calibration details, image capture positions, manual tie point positions, absolute camera position and orientation uncertainties, image overlap map, bundle block adjustment details, internal camera parameters, 2D keypoints table, 3D points from 2D keypoints matches, 2D keypoints matches, geolocation details, data processing details and configuration, and point cloud densification details.

In some examples, quality check data may include number of keypoints per image, image calibration information, camera optimization information, matching data information and georeferencing information.

In some examples of the system described herein, the thermal inspection report may be configured such that it is machine readable. For example, the thermal inspection report may be structured such that all text is stored as machine readable text data, and image data within the report is stored separately from the rest of the thermal inspection report.

In some examples, thermal inspection report may be transmitted by cloud processing device 108, over a network, to another computing device, for further use.

In operation, system 100 may be directed to collect data using UAV 102 as described above. Once data has been collected, collected data (including position and orientation data, visible light image data, and thermal image data) may be transmitted to cloud processing device 108 through network 106.

Cloud processing device 108 may receive collected data, and provide the position and orientation data, visible light image data, and thermal image data to position correlation module 138. Position correlation module may process collected data, and determine a scale for each captured image, and may skew or warp each image, such that the scale uniformly applied to each captured image. Position correlation module 138 may then output scale data 150. Data outputted by position correlation module 138 may be temporarily stored in memory 124, or storage medium 128 for archival or further processing.

Visible light image data, thermal image data, and scale data 150 may be provided to building envelope element detection module 132. Building envelope element detection module 132 may detect building elements within images as previously described. Building envelope element detection module 132 may output building element data 142, including a bounding box for each located building element, as well as a building element class label associated with each located building element. Building element data 150 may be temporarily stored in memory 124, or storage medium 128 for archival or further processing.

Visible light image data, thermal image data, scale data 150 and building element data 142 may be provided to thermal anomaly module 134 for processing to detect thermal anomalies within captured images, generating thermal anomaly data 140. Thermal anomaly module 134 may apply the step-walk process described herein to locate and identify thermal anomalies.

Overall thermal losses may be calculated by thermal loss module 152, and stored as thermal loss data 154 for further processing.

Visible light image data, thermal image data, scale data 150, building element data 142, thermal loss data 154 and thermal anomaly data 140 may be provided to report generation module 136 for processing and generation of a thermal inspection report 148. As previously described, the thermal inspection report 148 may be configured to be machine readable, such that the thermal inspection report 148 may be further processed. Additionally, the thermal inspection report may be configured and formatted, such that it may be read and interpreted by a human analyst.

The systems described above are configured such that once the flight path 110 has been selected and provided to the system, the system may generate a thermal report with little to no additional human intervention. The UAV 102 may conduct the flight, collect all required data, including position and orientation data, thermal and visible light images, and environmental data, and transmit this data to the cloud processing device 108. Once received by the cloud processing device, the collected data may be processed into a thermal report with no additional human intervention.

In some examples, human input may be required to define max-step and max-walk parameters to identify thermal anomalies.

In some examples, small amounts of human intervention may be required or optionally permitted. For example, a human operator may input report generation parameters (e.g. select report format, and analysis conducted), select a subset of the inspection structure that is to be inspected, manually review collected data before manually prompting the system to proceed with report generation, and other parameter adjustment and managerial type inputs.

Figure 14:
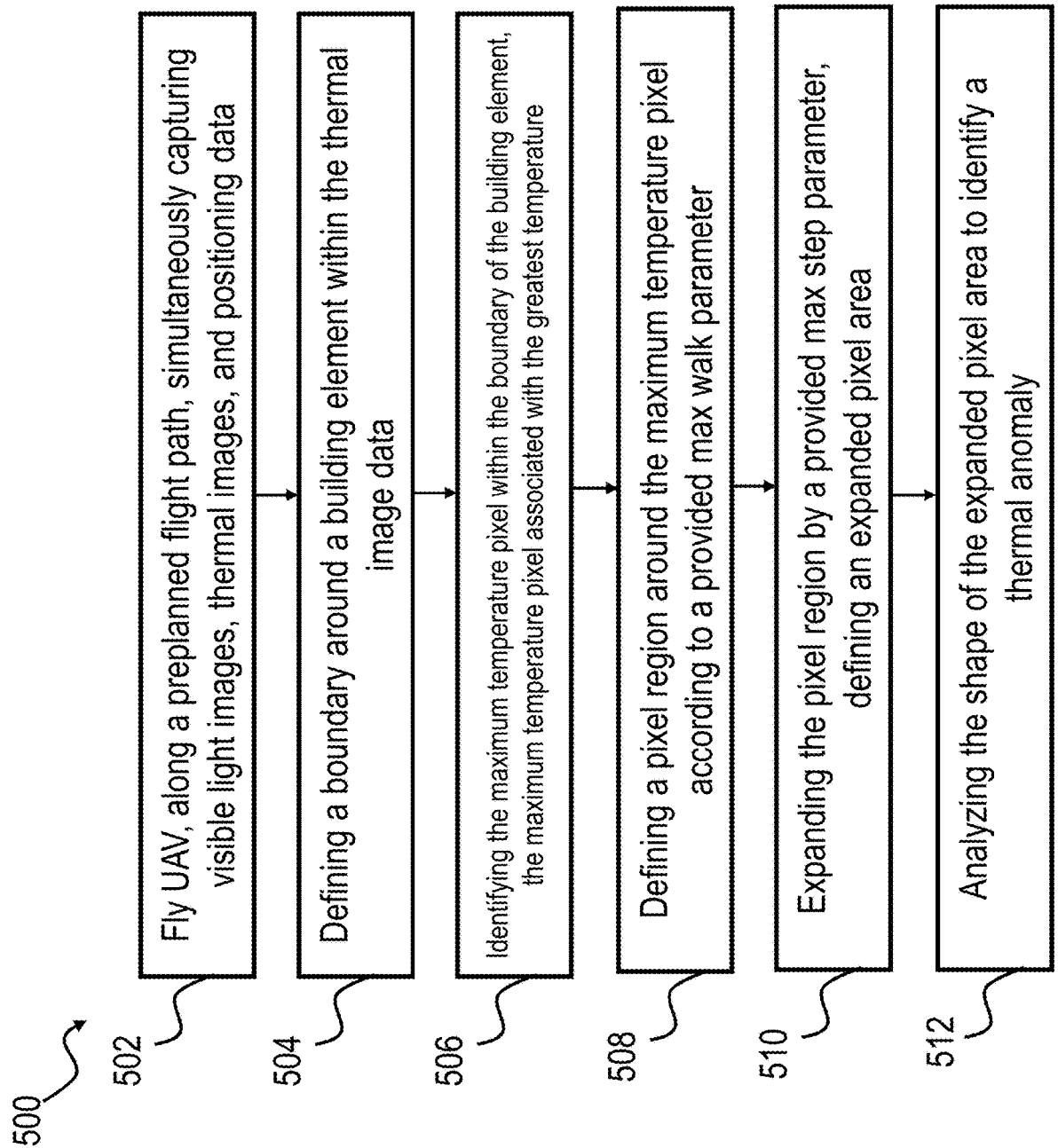
FIG. 14 is a flow chart of a thermal inspection method, according to an embodiment.

Referring now to FIG. 14, pictured therein is a flowchart depicting a method 500 of structure thermal inspection, according to an embodiment. Method 500 comprises 502, 504, 506, 508, 510, and 512. Description above in reference to systems 10, 100, and 200 above may apply to method 500

At 502, a UAV is flown, along a preplanned flight path, simultaneously capturing visible light images, thermal images, and positioning data At 504, a boundary is defined around a building element within the thermal image data At 506, the maximum temperature pixel within the boundary of the building element is identified, the maximum temperature pixel associated with the greatest temperature At 508, a pixel region around the maximum temperature pixel is defined according to a provided max walk parameter At 510, the pixel region is expanded by a provided max step parameter, defining an expanded pixel area.

At 512, the shape of the expanded pixel area is analyzed to identify a thermal anomaly.

While the above description provides examples of one or more apparatus, methods, or systems, it will be appreciated that other apparatus, methods, or systems may be within the scope of the claims as interpreted by one of skill in the art.

The invention claimed is:

1. A thermal inspection method, the method comprising:
providing an unmanned aerial vehicle ("UAV"), the UAV comprising a thermal camera for capturing thermal image data, a visible light camera for capturing visible light image data, and a positioning system for capturing positioning data;

operating the UAV by flying the UAV along a predetermined flight path around an inspection structure;
simultaneously capturing thermal image data of the inspection structure, visible light image data of the inspection structure, and positioning data at regular intervals, while the UAV flies along the flight path;
defining a boundary around a building element within the thermal image data;
identifying a maximum temperature pixel within the boundary of the building element, the maximum temperature pixel associated with the greatest temperature;
defining a pixel region around the maximum temperature pixel according to a provided max walk parameter;
expanding the pixel region by a provided max step parameter, defining an expanded pixel area around the maximum temperature pixel; and
analysing a shape of the expanded pixel area to identify a thermal anomaly.

2. The method of claim 1, further comprising:
calculating the heat loss rate of the building element;
estimating the heat loss rate of the building element if the thermal anomaly was not present; and
outputting a comparison of the estimated heat loss rate and calculated heat loss rate.

3. The method of claim 1, wherein temperature characteristics of the expanded pixel area is analysed to identify the thermal anomaly, the temperature characteristics including:
an absolute temperature of the expanded pixel area;
a temperature of the expanded pixel area relative to an ambient interior temperature of the inspection structure; and
a temperature of the expanded pixel area relative to an ambient exterior temperature.

4. The method of claim 1, wherein max step and max walk parameters are provided to the method by a human operator.

5. The method of claim 1, further comprising classifying the thermal anomaly as a known thermal anomaly class.

6. The method of claim 1, wherein analysing the shape of the expanded pixel area to identify a thermal anomaly comprises comparing the shape of the expanded pixel area to the shape of known thermal anomalies.

7. The method of claim 1, further comprising generating a thermal loss map corresponding to the building envelope of the inspection structure that depicts the thermal loss rate of the inspection structure.

8. The method of claim 1, wherein analysing the shape of the expanded pixel area to identify a thermal anomaly comprises applying a trained machine learning model to analyse the shape.

9. The method of claim 8, wherein the trained machine learning model is previously trained using known thermal anomaly data.

10. The method of claim 8, wherein the trained machine learning model comprises a neural network.

11. A thermal inspection system, the system comprising:
an unmanned aerial vehicle ("UAV"), the UAV comprising a thermal camera for capturing thermal image data, a visible light camera for capturing visible light image data, and a positioning system for capturing positioning data;
an inspection structure for inspecting using the UAV; and
a processor;
wherein the UAV is configured to fly along a predetermined flight path around the inspection structure, simultaneously capturing thermal image data of the inspection structure, visible light image data of the inspection structure, and positioning data at regular intervals, while the UAV flies along the flight path;
wherein the processor is configured to:
define a boundary around a building element within the thermal image data;
identify a maximum temperature pixel within the boundary of the building element, the maximum temperature pixel associated with the greatest temperature;
define a pixel region around the maximum temperature pixel according to a provided max walk parameter;
expand the pixel region by a provided max step parameter, defining an expanded pixel area around the maximum temperature pixel; and
analyse a shape of the expanded pixel area to identify a thermal anomaly.

12. The system of claim 11, wherein the processor is further configured to:
calculate the heat loss rate of the building element;
estimate the heat loss rate of the building element if the thermal anomaly was not present; and
output a comparison of the estimated heat loss rate and calculated heat loss rate.

13. The system of claim 11, wherein temperature characteristics of the expanded pixel area is analysed by the processor to identify the thermal anomaly, the temperature characteristics including:
an absolute temperature of the expanded pixel area;
a temperature of the expanded pixel area relative to an ambient interior temperature of the inspection structure; and
a temperature of the expanded pixel area relative to an ambient exterior temperature.

14. The system of claim 11, wherein max step and max walk parameters are provided to the method by a human operator.

15. The system of claim 11, wherein the processing is further configured to classify the thermal anomaly as a known thermal anomaly class.

16. The system of claim 11, wherein analysing the shape of the expanded pixel area to identify a thermal anomaly comprises comparing the shape of the expanded pixel area to the shape of known thermal anomalies.

17. The system of claim 11, wherein the processor is further configured to generate a thermal loss map corresponding to the building envelope of the inspection structure that depicts the thermal loss rate of the inspection structure.

18. The system of claim 11, wherein analysing the shape of the expanded pixel area to identify a thermal anomaly comprises applying a trained machine learning model to analyse the shape.

19. The system of claim 18, wherein the trained machine learning model is previously trained using known thermal anomaly data.

20. The system of claim 18, wherein the trained machine learning model comprises a neural network.

* * * * *